（12）United States Patent
Kuijper et al.

(10) Patent No.: US 8,189,446 B2
(45) Date of Patent: May 29, 2012

(54) OPTICAL RECORD CARRIER AS WELL AS AN APPARATUS AND METHOD FOR READING/WRITING IMAGE DATA FROM/AT A VISUALLY DETECTABLE PATTERN AT AN OPTICAL RECORD CARRIER

(75) Inventors: Maarten Kuijper, Taipei (TW); Johannes Francicus Petrus Claas, Taipei (TW)

(73) Assignee: Lite-On It Corporation, Taipei (TW)

( * ) Notice: Subject to any disclaimer, the term of this patent is extended or adjusted under 35 U.S.C. 154(b) by 201 days.

(21) Appl. No.: 12/543,254

(22) Filed: Aug. 18, 2009

(65) Prior Publication Data

US 2010/0067349 A1    Mar. 18, 2010

Related U.S. Application Data

(60) Provisional application No. 61/097,462, filed on Sep. 16, 2008.

(51) Int. Cl.
G11B 7/20    (2011.01)
(52) U.S. Cl. .................. 369/94; 369/275.1; 250/255
(58) Field of Classification Search .................. None
See application file for complete search history.

(56) References Cited

U.S. PATENT DOCUMENTS

| | | | | |
|---|---|---|---|---|
| 7,452,048 B2 * | 11/2008 | Silverbrook | ..................... | 347/16 |
| 7,756,400 B2 * | 7/2010 | Dorsh | ............................ | 386/228 |
| 2002/0195501 A1 * | 12/2002 | Mazaika | ........................ | 235/494 |
| 2003/0034463 A1 * | 2/2003 | Tullis | ............................ | 250/566 |
| 2006/0072440 A1 * | 4/2006 | Lambert et al. | ............. | 369/275.1 |
| 2006/0255144 A1 * | 11/2006 | Meier et al. | .................... | 235/454 |
| 2007/0157193 A1 * | 7/2007 | Lowe et al. | .................... | 717/168 |
| 2008/0247001 A1 * | 10/2008 | Maki et al. | ................... | 358/3.26 |

* cited by examiner

Primary Examiner — Joseph Feild
Assistant Examiner — Henok Heyi
(74) Attorney, Agent, or Firm — Thomas, Kayden, Horstemeyer & Risley, LLP

(57) ABSTRACT

A method is disclosed of reading an image data from an optical record carrier with a visually detectable pattern comprising a visually detectable pattern of pixels comprising at least one pattern element comprising an area of size s1 with a relatively low value v1 for an optical property and an area with size s2 with a relatively high value v2 for said optical property, wherein the data representative for a structure of the visually detectable pattern is embedded by variations in one or more of the parameters s1, v1, s2, v2 of the pattern elements. The method comprising the steps of scanning the visually detectable pattern and generating a detection signal representative for a visual property of the pattern as a function of position, retrieving the image data from the signal, retrieving an embedded data from the signal, generating an address data using said embedded data, storing image data values at addresses indicated by said address data.

7 Claims, 19 Drawing Sheets

| primary data | codeword | \multicolumn{8}{c|}{Contrast enhancement code} |
| --- | --- | --- | --- | --- | --- | --- | --- | --- | --- |
|  |  | b7 | b6 | b5 | b4 | b3 | b2 | b1 | b0 |
| 0x0 | 0x05 | 0 | 0 | 0 | 0 | 0 | 1 | 0 | 1 |
| 0x1 | 0x09 | 0 | 0 | 0 | 0 | 1 | 0 | 0 | 1 |
| 0x2 | 0x0A | 0 | 0 | 0 | 0 | 1 | 0 | 1 | 0 |
| 0x3 | 0x11 | 0 | 0 | 0 | 1 | 0 | 0 | 0 | 1 |
| 0x4 | 0x12 | 0 | 0 | 0 | 1 | 0 | 0 | 1 | 0 |
| 0x5 | 0x14 | 0 | 0 | 0 | 1 | 0 | 1 | 0 | 0 |
| 0x6 | 0x21 | 0 | 0 | 1 | 0 | 0 | 0 | 0 | 1 |
| 0x7 | 0x22 | 0 | 0 | 1 | 0 | 0 | 0 | 1 | 0 |
| 0x8 | 0x24 | 0 | 0 | 1 | 0 | 0 | 1 | 0 | 0 |
| 0x9 | 0x28 | 0 | 0 | 1 | 0 | 1 | 0 | 0 | 0 |
| 0xA | 0x41 | 0 | 1 | 0 | 0 | 0 | 0 | 0 | 1 |
| 0xB | 0x42 | 0 | 1 | 0 | 0 | 0 | 0 | 1 | 0 |
| 0xC | 0x44 | 0 | 1 | 0 | 0 | 0 | 1 | 0 | 0 |
| 0xD | 0x48 | 0 | 1 | 0 | 0 | 1 | 0 | 0 | 0 |
| 0xE | 0x50 | 0 | 1 | 0 | 1 | 0 | 0 | 0 | 0 |
| 0xF | 0x18 | 0 | 0 | 0 | 1 | 1 | 0 | 0 | 0 |

Figure 6A

| Primary data | Contrast Code word | Contrast code bits |           |           |           |           |           |           |           |           |           |           |           |
|--------------|--------------------|---|---|---|---|---|---|---|---|---|---|---|---|
| 0x00 | 0x0009 | 0 | 0 | 0 | 0 | 0 | 0 | 0 | 0 | 1 | 0 | 0 | 1 |
| 0x01 | 0x0011 | 0 | 0 | 0 | 0 | 0 | 0 | 0 | 1 | 0 | 0 | 0 | 1 |
| 0x02 | 0x0012 | 0 | 0 | 0 | 0 | 0 | 0 | 0 | 1 | 0 | 0 | 1 | 0 |
| 0x03 | 0x0021 | 0 | 0 | 0 | 0 | 0 | 0 | 1 | 0 | 0 | 0 | 0 | 1 |
| 0x04 | 0x0022 | 0 | 0 | 0 | 0 | 0 | 0 | 1 | 0 | 0 | 0 | 1 | 0 |
| 0x05 | 0x0024 | 0 | 0 | 0 | 0 | 0 | 0 | 1 | 0 | 0 | 1 | 0 | 0 |
| 0x06 | 0x0041 | 0 | 0 | 0 | 0 | 0 | 1 | 0 | 0 | 0 | 0 | 0 | 1 |
| 0x07 | 0x0042 | 0 | 0 | 0 | 0 | 0 | 1 | 0 | 0 | 0 | 0 | 1 | 0 |
| 0x08 | 0x0044 | 0 | 0 | 0 | 0 | 0 | 1 | 0 | 0 | 0 | 1 | 0 | 0 |
| 0x09 | 0x0048 | 0 | 0 | 0 | 0 | 0 | 1 | 0 | 0 | 1 | 0 | 0 | 0 |
| 0x0A | 0x0081 | 0 | 0 | 0 | 0 | 1 | 0 | 0 | 0 | 0 | 0 | 0 | 1 |
| 0x0B | 0x0082 | 0 | 0 | 0 | 0 | 1 | 0 | 0 | 0 | 0 | 0 | 1 | 0 |
| 0x0C | 0x0084 | 0 | 0 | 0 | 0 | 1 | 0 | 0 | 0 | 0 | 1 | 0 | 0 |
| 0x0D | 0x0088 | 0 | 0 | 0 | 0 | 1 | 0 | 0 | 0 | 1 | 0 | 0 | 0 |
| 0x0E | 0x0090 | 0 | 0 | 0 | 0 | 1 | 0 | 0 | 1 | 0 | 0 | 0 | 0 |
| 0x0F | 0x0101 | 0 | 0 | 0 | 1 | 0 | 0 | 0 | 0 | 0 | 0 | 0 | 1 |

| Primary data | Contrast Code word | Contrast code bits | | | | | | | | | | | | | | | |
|---|---|---|---|---|---|---|---|---|---|---|---|---|---|---|---|---|---|
| 0x00 | 0x0021 | 0 | 0 | 0 | 0 | 0 | 1 | 0 | 0 | 0 | 0 | 1 | 0 | 0 | 0 | 0 | 1 |
| 0x01 | 0x0041 | 0 | 0 | 0 | 0 | 0 | 1 | 0 | 0 | 0 | 1 | 0 | 0 | 0 | 0 | 0 | 1 |
| 0x02 | 0x0042 | 0 | 0 | 0 | 0 | 0 | 1 | 0 | 0 | 0 | 1 | 0 | 0 | 0 | 0 | 1 | 0 |
| 0x03 | 0x0081 | 0 | 0 | 0 | 0 | 0 | 1 | 0 | 0 | 1 | 0 | 0 | 0 | 0 | 0 | 0 | 1 |
| 0x04 | 0x0082 | 0 | 0 | 0 | 0 | 0 | 1 | 0 | 0 | 1 | 0 | 0 | 0 | 0 | 0 | 1 | 0 |
| 0x05 | 0x0084 | 0 | 0 | 0 | 0 | 0 | 1 | 0 | 0 | 1 | 0 | 0 | 0 | 0 | 1 | 0 | 0 |
| 0x06 | 0x0101 | 0 | 0 | 0 | 0 | 0 | 1 | 0 | 1 | 0 | 0 | 0 | 0 | 0 | 0 | 0 | 1 |
| 0x07 | 0x0102 | 0 | 0 | 0 | 0 | 0 | 1 | 0 | 1 | 0 | 0 | 0 | 0 | 0 | 0 | 1 | 0 |
| 0x08 | 0x0104 | 0 | 0 | 0 | 0 | 0 | 1 | 0 | 1 | 0 | 0 | 0 | 0 | 0 | 1 | 0 | 0 |
| 0x09 | 0x0108 | 0 | 0 | 0 | 0 | 0 | 1 | 0 | 1 | 0 | 0 | 0 | 0 | 1 | 0 | 0 | 0 |
| 0x0A | 0x0201 | 0 | 0 | 0 | 0 | 0 | 1 | 1 | 0 | 0 | 0 | 0 | 0 | 0 | 0 | 0 | 1 |
| 0x0B | 0x0202 | 0 | 0 | 0 | 0 | 0 | 1 | 1 | 0 | 0 | 0 | 0 | 0 | 0 | 0 | 1 | 0 |
| 0x0C | 0x0204 | 0 | 0 | 0 | 0 | 0 | 1 | 1 | 0 | 0 | 0 | 0 | 0 | 1 | 0 | 0 | 0 |
| 0x0D | 0x0208 | 0 | 0 | 0 | 0 | 0 | 1 | 1 | 0 | 0 | 0 | 0 | 1 | 0 | 0 | 0 | 0 |
| 0x0E | 0x0210 | 0 | 0 | 0 | 0 | 0 | 1 | 1 | 0 | 0 | 0 | 1 | 0 | 0 | 0 | 0 | 0 |
| 0x0F | 0x0401 | 0 | 0 | 0 | 0 | 1 | 0 | 0 | 0 | 0 | 0 | 0 | 0 | 0 | 0 | 0 | 1 |

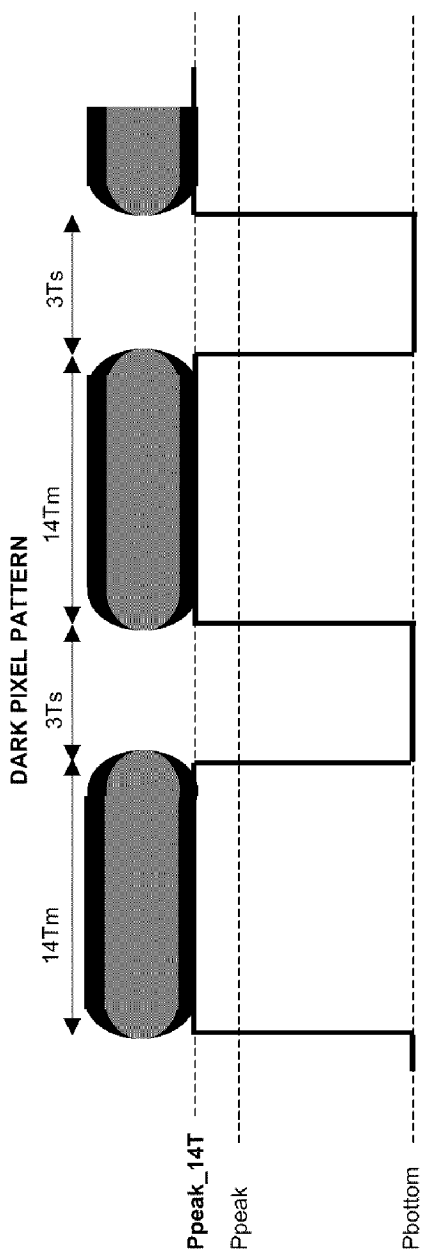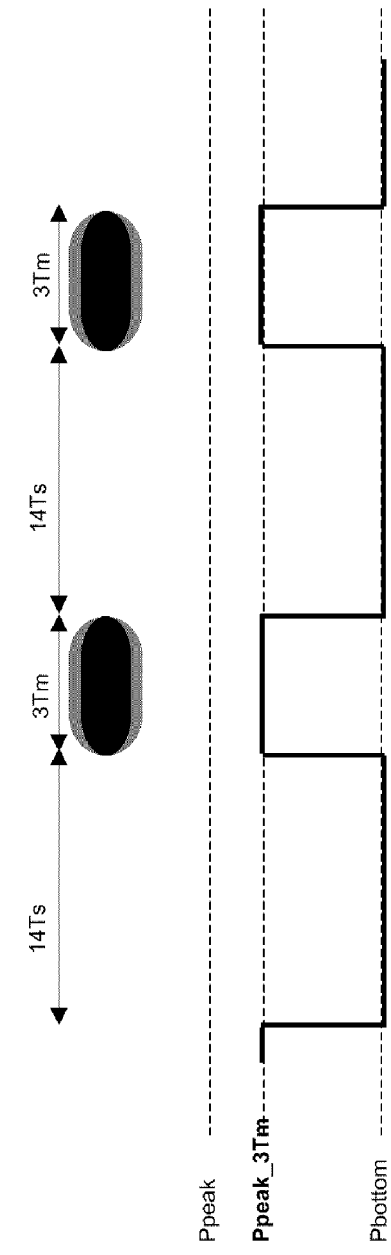

OPTICAL RECORD CARRIER AS WELL AS AN APPARATUS AND METHOD FOR READING/WRITING IMAGE DATA FROM/AT A VISUALLY DETECTABLE PATTERN AT AN OPTICAL RECORD CARRIER

CROSS REFERENCE TO RELATED APPLICATION

This application claims the benefit of priority under 35 U.S.C Section 119 from U.S. Provisional Patent Application Ser. No. 61/097,462, filed on Sep. 16, 2008.

BACKGROUND OF THE INVENTION

1. Field of the Invention

The present invention relates to an optical record carrier with a visually detectable pattern.

The present invention further relates to a method of reading image data from an optical record carrier with a visually detectable pattern.

The present invention still further relates to an apparatus for reading image data from an optical record carrier with a visually detectable pattern.

The present invention still further relates to a method of writing image data as a visually detectable pattern.

The present invention still further relates to an apparatus for writing image data at an optical record carrier as a visually detectable pattern.

2. Related Art

A visually detectable pattern comprises for example a logo, a sequence of characters or a combination thereof. The visually detectable pattern is printed at a resolution suitable for detection by the human visual system. For example, the visually detectable pattern may be printed at a resolution of 1 to several hundreds dots per $mm^2$ (as compared to computer readable data, which is stored at the record carrier at a resolution in the order of several Mbits/$mm^2$). In this way, a user does not need a reading device to recognize the contents of the optical disk, but a simple visual inspection suffices. Such a visually detectable pattern can also serve as a means to detect the authenticity of the record carrier.

An apparatus for providing a visually detectable pattern is disclosed in U.S. Pat. No. 7,082,094. The apparatus records a visually detectable pattern at a disk by irradiating a laser beam from a pickup. In this way the same apparatus used to record data can be used to print labels presenting content information. It is attractive to be able to edit the visually detectable pattern. However, a digital representation is required to achieve this. Such a digital representation may be stored in a data zone at the record carrier, but this requires additional storage space. Also administration data is required that enables an apparatus to retrieve the digital representation from the record carrier.

There is a need to retrieve a digital version of the image represented by the visually detectable pattern from the record carrier so that the image can be stored and/or edited, while obviating the use of significant additional storage space.

SUMMARY OF THE INVENTION

According to an aspect of the invention, there is provided a method of reading an image data from an optical record carrier with a visually detectable pattern comprising a visually detectable pattern of pixels comprising at least one pattern element comprising an area of size s1 with a relatively low value v1 for an optical property and an area with size s2 with a relatively high value v2 for said optical property, the method comprising the steps of scanning the visually detectable pattern and generating a detection signal representative for a visual property of the pattern as a function of position;

retrieving the image data from the signal; and storing image data values.

According to the present invention, the record carrier is read in an unusual way. Instead of reading a digital representation from the record carrier, applying channel decoding, and error correction decoding as is usual when reading data from an optical record carrier, the visually detectable pattern is scanned and the generated detection signal is used to reconstruct image data that is subsequently stored. The stored image data can be edited and processed in various other ways for example to improve a quality of the visually detectable pattern, while it is avoided that additional storage space at the record carrier has to be occupied.

Image recognition techniques may be used to recognize the presence of the visually detectable pattern and its boundaries. However, it is favourable when scanning the image if some data indicative for a structure of the visually detectable pattern is present, e.g. in a data-zone of the record carrier.

According to an embodiment of this method, a record carrier is read comprising a data representative for a structure of the visually detectable pattern, the data being embedded by variations in one or more of the parameters s1, v1, s2, v2 of the pattern elements, the method further comprising the steps of retrieving embedded data from the detection signal; and generating address data using said embedded data;

wherein the image data values are stored at addresses indicated by said address data.

As the data is embedded in the visually detectable pattern itself, still no additional storage space is required. Both image data and embedded data can be retrieved with the same detection signal.

According to an aspect of the invention, there is provided an apparatus for reading image data from an optical record carrier with a visually detectable pattern comprising a visually detectable pattern of pixels comprising at least one pattern element comprising an area of size s1 with a relatively low value v1 for an optical property and an area with size s2 with a relatively high value v2 for said optical property, the apparatus comprising a facility for scanning the visually detectable pattern and generating a detection signal representative for a visual property of the pattern as a function of position;

a facility for retrieving image data from the detection signal; and a facility for storing image data values.

In an embodiment, the apparatus is arranged for reading a record carrier wherein a data representative for a structure of the visually detectable pattern is embedded by variations in one or more of the parameters s1, v1, s2, v2 of the pattern elements is provided, the apparatus further comprising:

a facility for retrieving embedded data from the detection signal; and a facility for generating address data using said embedded data;

wherein the facility for storing is arranged for storing the image data values at addresses indicated by said address data.

According to an aspect of the invention, a record carrier is provided comprising a visually detectable pattern of pixels comprising at least one pattern element comprising an area of size s1 with a relatively low value v1 for an optical property and an area with size s2 with a relatively high value v2 for said optical property, wherein data representative for a structure of the visually detectable pattern is embedded by variations in one or more of the parameters s1, v1, s2, v2 of the pattern elements, that are smaller than the variations caused by the presence of the visually detectable pattern.

The data embedded in the visually detectable pattern is for example indicative for a radial position, for example indicated by a line number, or a tangential position. As the pattern elements comprise an area of size s1 with a relatively low value v1 for an optical property and an area with size s2 with a relatively high value v2, the pattern comprises sufficiently high frequent information to enable a tracking servo system to position a read head within the visually detectable pattern. Moreover, the structure of the pattern elements allows for variations in one or more of their parameters s1, v1, s2, v2 that are smaller than the variations caused by the presence of the visually detectable pattern. The data embedded as the variations strongly facilitates the retrieval of a digital version of the image represented by the visually detectable pattern.

According to an aspect of the invention, there is provided a method of writing image data as a visually detectable pattern at a record carrier, comprising the steps of, providing a record carrier;

providing image data;

providing structure data representative for a structure of the image data;

combining the image data and the structure data; and generating a write signal representative for the image data and the structure data and writing a visually detectable pattern of pixels at the record carrier using this write signal, the pixels comprising at least one pattern element comprising an area of size s1 with a relatively low value v1 for an optical property and an area with size s2 with a relatively high value v2 for said optical property, wherein data representative for a structure of the visually detectable pattern is embedded by variations in one or more of the parameters s1, v1, s2, v2 of the pattern elements.

An embodiment of the method of writing, wherein the record carrier comprises an already present visually detectable pattern and wherein the visually detectable pattern written at the record carrier is a further visually detectable pattern, additionally comprising the steps of retrieving a position value from the record carrier indicative for a position of the already present visually detectable pattern; and using the position value to align the further visually detectable pattern with the already present visually detectable pattern.

According to an aspect of the invention, there is provided an apparatus for writing image data as a visually detectable pattern at a record carrier, comprising:

a facility for receiving a record carrier;

a facility for providing image data;

a facility for providing structure data representative for a structure of the image data;

a facility for combining the image data and the structure data;

a facility for generating a write signal representative for the image data and the structure data; and a facility for writing a visually detectable pattern of pixels at the record carrier using this write signal, the pixels comprising at least one pattern element comprising an area of size s1 with a relatively low value v1 for an optical property and an area with size s2 with a relatively high value v2 for said optical property, wherein data representative for a structure of the visually detectable pattern is embedded by variations in one or more of the parameters s1, v1, s2, v2 of the pattern elements.

In an embodiment of the record carrier, each pixel comprises a plurality of identical pattern elements. In this way, a well processable signal is obtained when scanning the pattern.

Accordingly, this embodiment facilitates a favourable embodiment of the method of reading of the invention wherein the image data and structure data is retrieved from global signal properties, such as a duty cycle (representative for a runlength distribution), a peak and bottom values as well as the asymmetry and the modulation of the signal.

The visually detectable pattern may be present at a side opposite to a side that comprises regular data. It is however advantageous if the visually detectable pattern is applied at the side of the record carrier that also accommodates the regular data, to facilitate that the visually detectable pattern can be applied by the same means as such regular data, and it is not necessary to turn the record carrier.

The optical record carrier may for example be an optical disc, e.g. one of the types CD-R, CD-RW, DVD+/−R, DVD+/−RW, BD-R, BD-RE, or HD-DVD. [DVD-RAM] Alternatively, the optical record carrier may be another medium that can be read out with optical means, e.g. a credit card CD, provided that the data is arranged on such an optical record carrier as in an optical disc, i.e. spirally or concentrically arranged around a centre of rotation.

Various recording modes are possible at basic format level, e.g. disc at once, multi-session, sequential with or without logical overwrite and random.

BRIEF DESCRIPTION OF THE DRAWINGS

These and other aspects are described in more detail with reference to the drawing. Therein:

FIG. 6A shows a first embodiment of a contrast enhancement code, FIG. 6B shows a second embodiment of a contrast enhancement code, FIG. 6C shows a third embodiment of a contrast enhancement code, FIG. 15A illustrates a first aspect of a method according to the invention of writing a visually detectable pattern with embedded data at a record carrier, FIG. 15B illustrates a second aspect of a method according to the invention of writing a visually detectable pattern with embedded data at a record carrier.

DETAILED DESCRIPTION OF EMBODIMENTS

Figure 1:
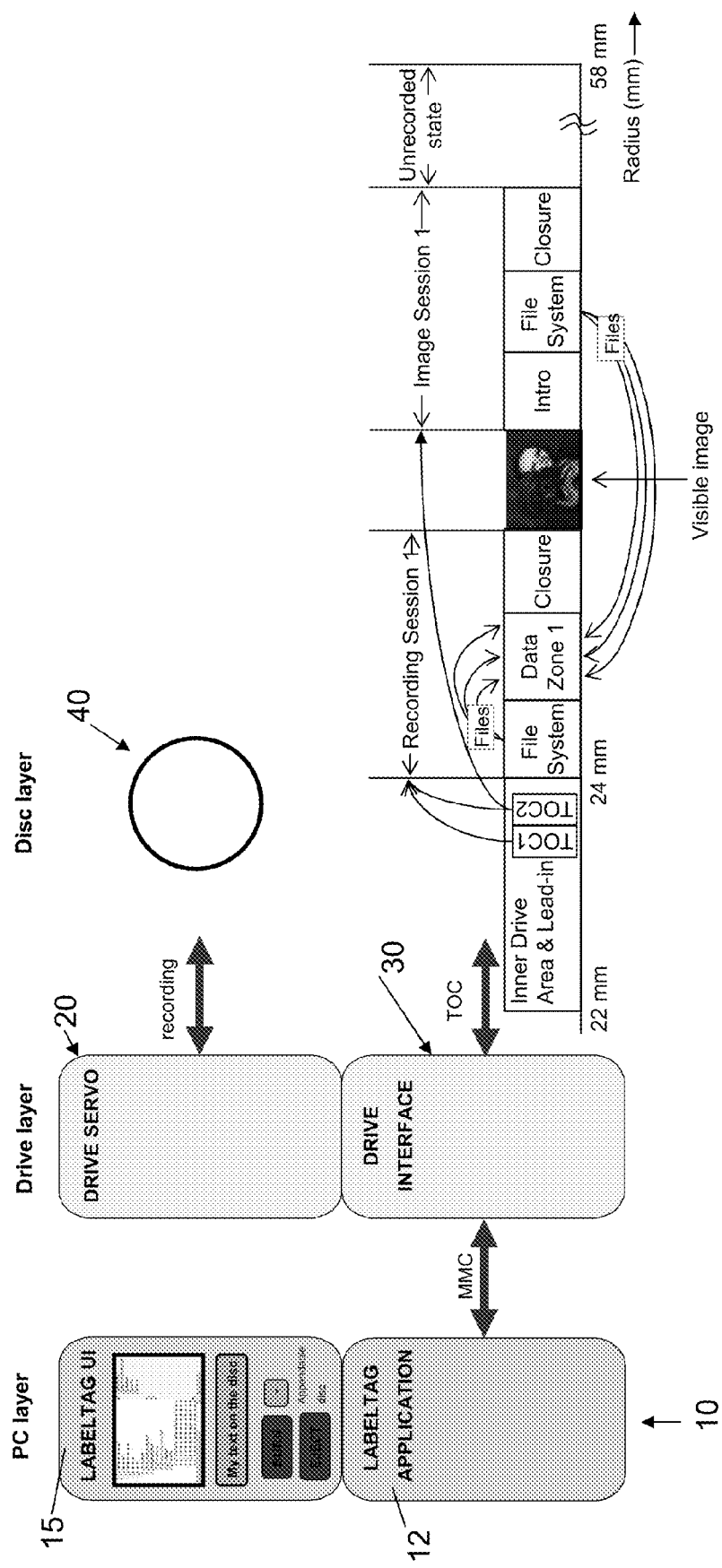
FIG. 1 shows an overview of a system for applying a visually detectable pattern at a record carrier.

In the following detailed description, numerous specific details are set forth in order to provide a thorough understanding of the present invention. However, it will be understood by one skilled in the art that the present invention may be practiced without these specific details. In other instances, well known methods, procedures, and components have not been described in detail so as not to obscure aspects of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. All publications, patent applications, patents, and other references mentioned herein are incorporated by reference in their entirety. In case of conflict, the present specification, including definitions, will control. In addition, the materials, methods, and examples are illustrative only and not intended to be limiting.

FIG. 1 presents an overview of a system arranged for applying a visual detectable pattern at an optical record carrier 40. At the highest level, the system comprises a host module 10 and a drive-module 20. A host application 12 at the host module 10 controls the location of regular user data including the structure of a file system wherein the regular data is organized and is responsible for close and append operations of the optical record carrier 40. The host module 10 may further provide for a user interface 15 that facilitates the user to enter image data to be applied on the record carrier 40, e.g. a name or a LOGO. Alternatively the host application 12 may autonomously calculate image data to be applied at the disc, for example an image that indicates the date of recording may be applied as the visually detectable pattern. In the host application 12, a bit-map representation is generated, for example from the user data provided via the user interface. The host module 10 then sends print commands with the pixel information of the image to the drive-module 20. This aspect is described in more detail in earlier filed application P82011US00 filed as provisional application U.S. 60/954,490. Additionally the print command may comprise a physical sector number as a second value. The drive-module can use the second value as an anchor address to align the visually detectable pattern, for example to align it with another visually detectable pattern. The drive-module may use this information to achieve tangential alignment. Alternatively or additionally information may be present that can be used by the drive-module to radially position the other visually detectable pattern with the already present visually detectable pattern.

The anchor address may for example be stored at the record carrier 40. On the other hand, the host module 10 or the drive-module may comprise a table that registers the anchor addresses for the record carriers that are read and/or written thereon. Storing the anchor address at the record carrier 40 itself has the advantage that the stored anchor address is also available when it is read and/or written at another apparatus. The anchor address is for example the first physical sector number occupied by the visually detectable pattern or the first physical sector number of a buffer zone preceding the pattern. Upon request the drive-module may also retrieve the anchor address. A predetermined value of the anchor address e.g. 0 may be reserved to indicate that there is no anchor address yet. The drive-module 20 on its turn has a drive interface part 30 and a drive servo part 50. The drive interface part 30 handles the print commands issued by the host module 10 and records the regular data, including session lead in, closures, intro and lead out. The drive interface part 30 takes care of the interpretation of the pixel information and location of the image on the disc. The drive servo part 50 finally records the pixel information on the correct location including the encoded line numbering. The drive servo part 50 controls the record power, motor frequency, pixel frequency and channel bit frequency.

Figure 2:
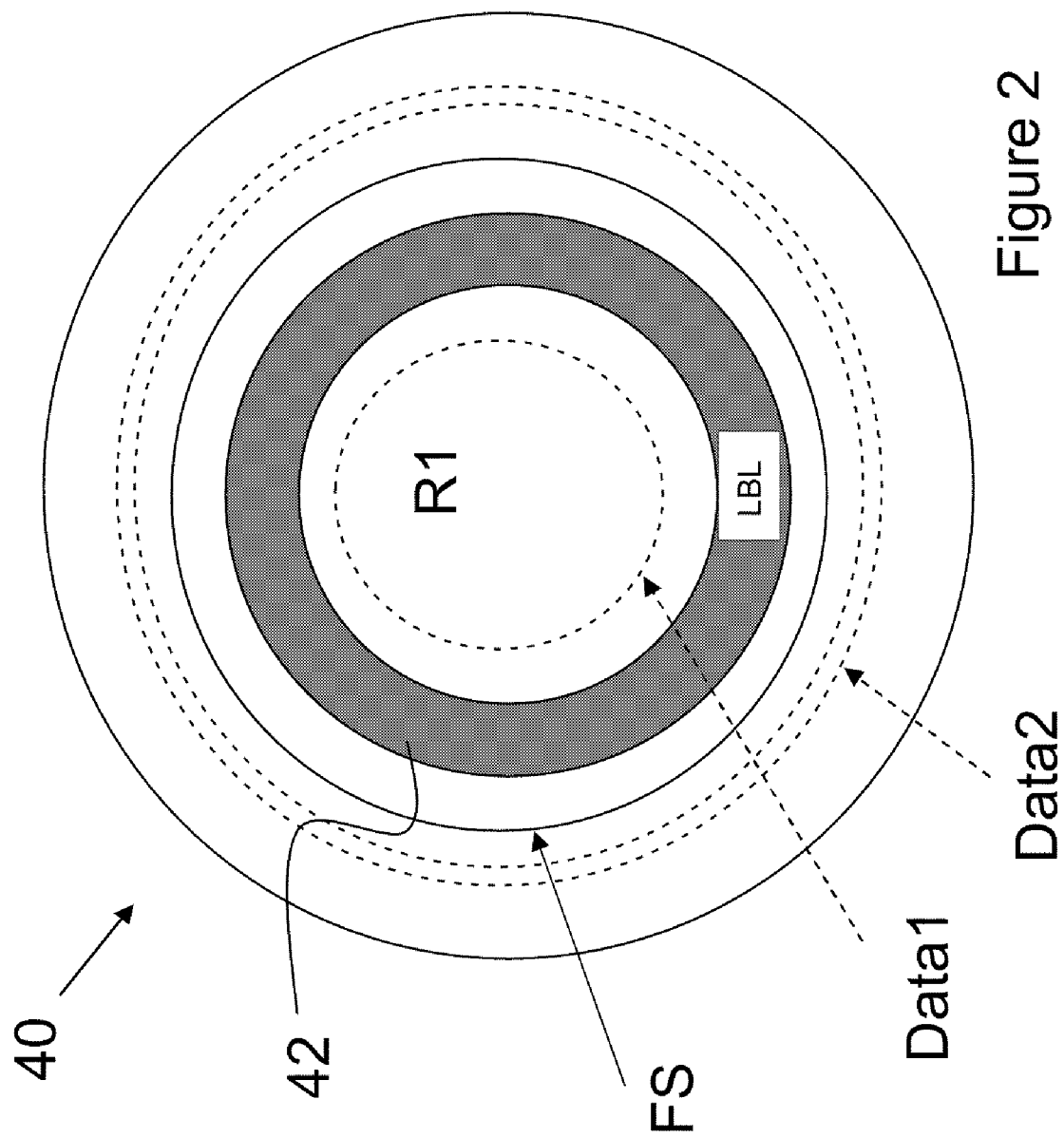
FIG. 2 shows a record carrier according to the invention with a visually detectable pattern.

FIG. 2 shows in more detail a record carrier 40 comprising a zone 42 with a visually detectable pattern LBL. In the embodiment shown the record carrier 40 further comprises a first and a second data zone Data1, Data2 and a file system FS. The visually detectable pattern LBL is for example a text or an image that is indicative for the content of the disc, a date of recording, or the name of the owner.

Figure 3:
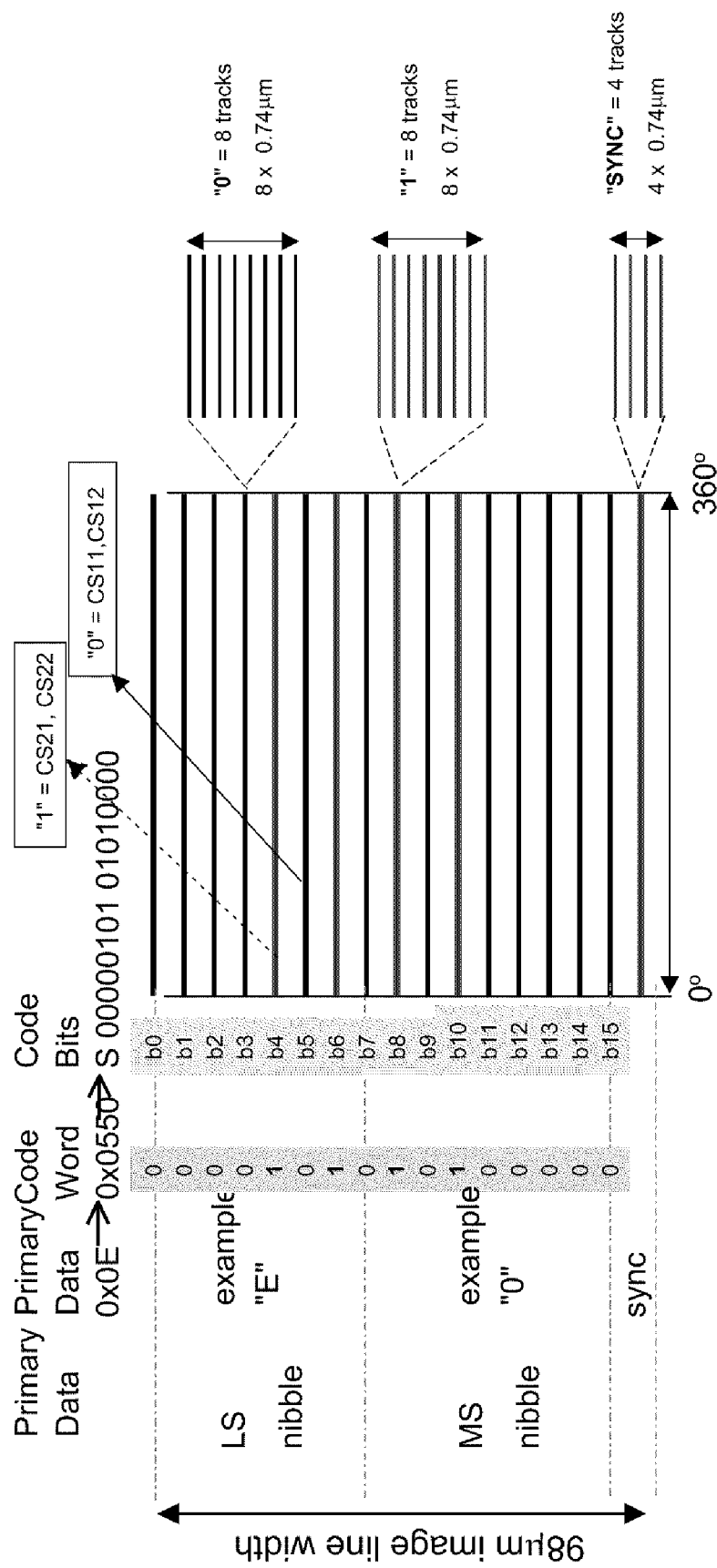
FIG. 3 shows a detail in FIG. 2 of the pattern with embedded data.

FIG. 3 shows how a single line of the visually detectable pattern is mapped at a plurality of tracks. In this case an image line is mapped at 16 groups of subsequent tracks, wherein, in this case, each group comprises a set of 8 tracks. In this example, the individual tracks have a width of 0.74 μm, and the image line has a width of 98 μm. However, in other embodiments the number of groups or the number of tracks within a group may be different, depending on a desired resolution of the image and a desired accuracy for retrieving the image data and the embedded data.

Each pixel comprises a plurality of identical pattern elements, in this case comprises 33 pattern elements. However, depending on the desired resolution and a desired accuracy with which the data should be retrieved from the record carrier, a different number of pattern elements may be used. A pattern element comprises an area of size s1 with a relatively low value v1 for an optical property and an area with size s2 with a relatively high value v2 for said optical property, wherein data representative for a structure of the visually detectable pattern is embedded by variations in one or more of the parameters s1, v1, s2, v2 of the symbols. In the sequel, it is presumed for clarity that the areas having the low value and the high value for the optical property substantially have the same width so that their size is determined by their length. For clarity it will further be assumed that the optical property is the reflectivity. Nevertheless in other embodiments the size of the areas may (additionally) be determined by their width as illustrated with reference to FIGS. 15A-15C. Likewise, other parameters may be selected as the optical property, e.g. the absorption. In again another embodiment the optical property may be the extent to which the area reflects light having a particular polarization.

Figure 4:
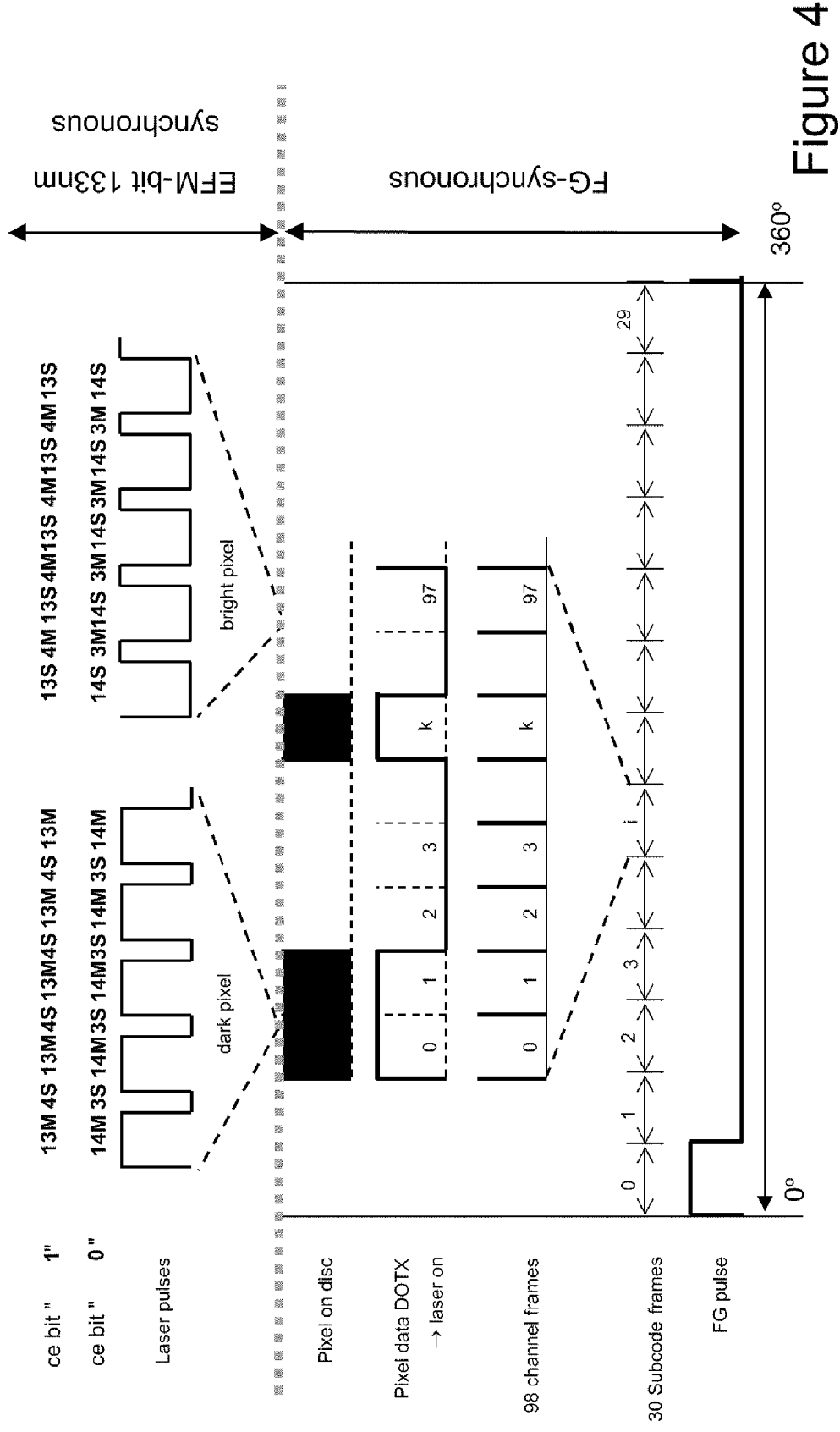
FIG. 4 shows a detail of FIG. 3.
Figure 5A:
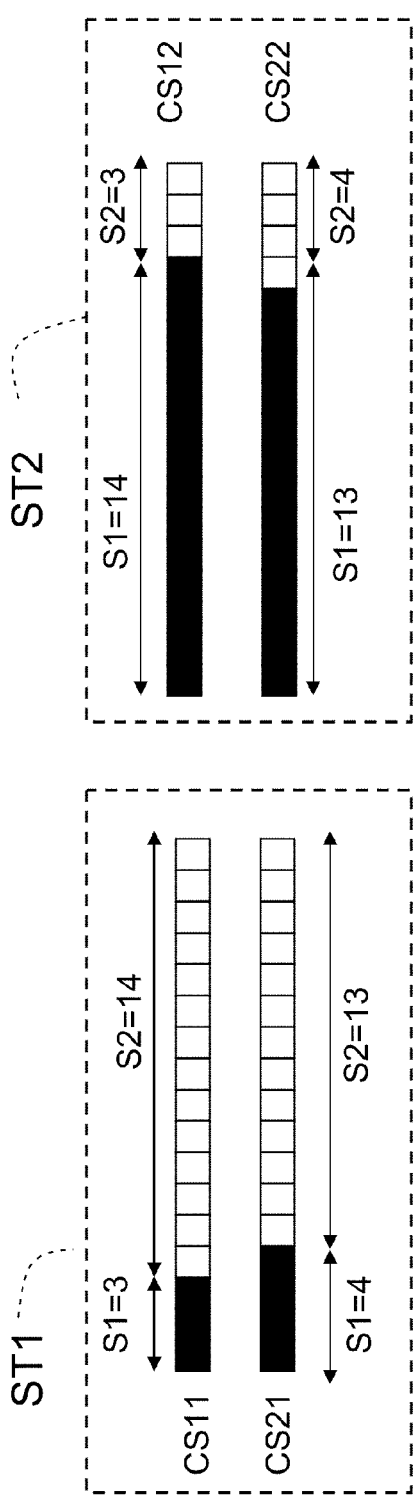
FIG. 5A shows a first embodiment of pattern elements used to apply the visually detectable pattern with the embedded data.

As shown in FIG. 4, a first type of pixels appears as bright, as a first type of pattern element selected from a first subset ST1 of pattern elements is used. The first subset ST1 comprises a first pattern element CS11 having a bright area of length of 13 units and a dark area having a length of 4 units, and a second pattern element CS12 having a bright area of length of 14 units and a dark area having a length of 3 units. Likewise a second type of pixels appears as dark, as a second type of pattern element selected from a second subset of pattern elements ST2 is used. The second subset comprises a first pattern element CS12 having a dark area of length of 13 units and a bright area having a length of 4 units, and a second pattern element CS22 having a dark area of length of 14 units and a bright area having a length of 3 units. This is schematically shown in FIG. 5A. Data representative for a structure of the visually detectable pattern is embedded by variations in one or more of the parameters s1, v1, s2, v2 of the symbols, which variations are smaller than the variations caused by the presence of the visually detectable pattern.

In this case, a bit "0" or a bit "1" are embedded in a "bright" pixel by selection of the pattern element CS11 or the pattern element CS21 respectively, and a bit "0" or a bit "1" are embedded in a "dark" pixel by selection of the pattern element CS12 or the pattern element CS22 respectively.

The visual content of the visually detectable pattern can be easily detected if the variations in the one or more of the parameters s1, v1, s2, v2 of the symbols are smaller than the variations caused by the presence of the visually detectable pattern.

For the visual appearance, it is advantageous if the plurality of pattern elements within a subset have a distance that is substantially less than the distance between pattern elements of mutually different subsets, wherein the distance D between two pattern elements is defined as the absolute difference between the ratios s1/(s1+s2).

The mutual distance between two pattern elements CS, CS' is defined as $$D(CS, CS') = \left| \frac{s1}{s1+s2} - \frac{s1'}{s1'+s2'} \right|,$$

wherein s1, s2 are the sizes of the areas with the relatively low value of the optical property and with the relatively high value of the optical property respectively for the pattern element CS, and s1', s2' are the corresponding values for the pattern element CS'.

Several examples of sets of pattern elements complying with this relation are shown in FIGS. 5A-5E. Therein the pattern elements used in the visual detectable pattern in the embodiment shown in FIGS. 1 to 4 is illustrated in FIG. 5A.

In the embodiment shown in FIG. 5A, the plurality of subsets of pattern elements is two and the plurality of pattern elements within each subset is two. The first ST1 of the two subsets of pattern elements comprises pattern elements having a value for s1 less than s2, and the second ST2 of the two subsets of pattern elements comprises pattern elements having a value for s1 greater than s2.

Therein the first subset ST1 comprises a pair of pattern elements CS11 with s1=3, s2=14 and CS21 with s1=4, s2=13. The second subset ST2 of patte comprises a first pattern element CS12 with s1=14, s2=3 and a second pattern element CS22 with s1=13 and s2=4.

The distance D between the pattern elements CS11 and CS21 is 0.059. Likewise the distance between the pattern elements CS12 and CS22 is 0.059. This is substantially less than the distance between any two pattern elements between different sets. The latter distance is minimally the distance between the pattern elements CS21 and CS22, which is 0.53.

The minimum value MAX of s2 for all pattern elements in the first subset ST1 and of s1 for all pattern elements in the second subset ST2 is 13 in this embodiment.

The maximum value MIN of s1 for all pattern elements in the first subset ST1 and of s2 for all pattern elements ST2 in the second subset is 4.

Accordingly the ratio $$\frac{MAX - MIN}{MAX + MIN} = 0.52$$

So that the pattern elements comply with the following relation:

$$\frac{MAX - MIN}{MAX + MIN} \geq 0.4,$$

wherein

A value higher than 0.4 of this ratio is particularly attractive for media having a relatively small difference between the relatively low value for the optical property and the relatively high value for the optical property.

Figure 5B:
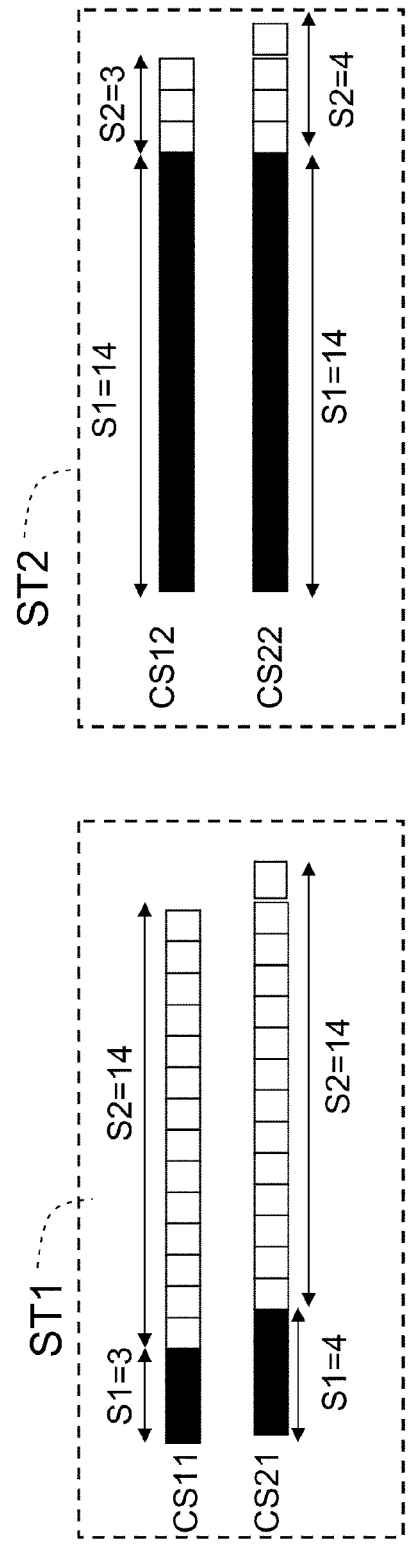
FIG. 5B shows a second embodiment of pattern elements used to apply the visually detectable pattern with the embedded data.

In the embodiment shown in FIG. 5A, the EFM+ code used for DVD is presumed, having a symbol length of 14 units is presumed. Alternatively the EFM code for CD with runlength 14 or the 17PP code used for BD may be used. Alternatively another coding may be used having pattern elements in the form of an area of size s1 with a relatively low value v1 for an optical property and an area with size s2 with a relatively high value v2 for said optical property. One example thereof is shown in FIG. 5B. There the pattern elements CS11 and CS21 of the first subset ST1 have different length, 17 and 18 units respectively. Likewise the pattern elements CS12 and CS22 of the second subset ST2 have a different length.

Figure 5C:
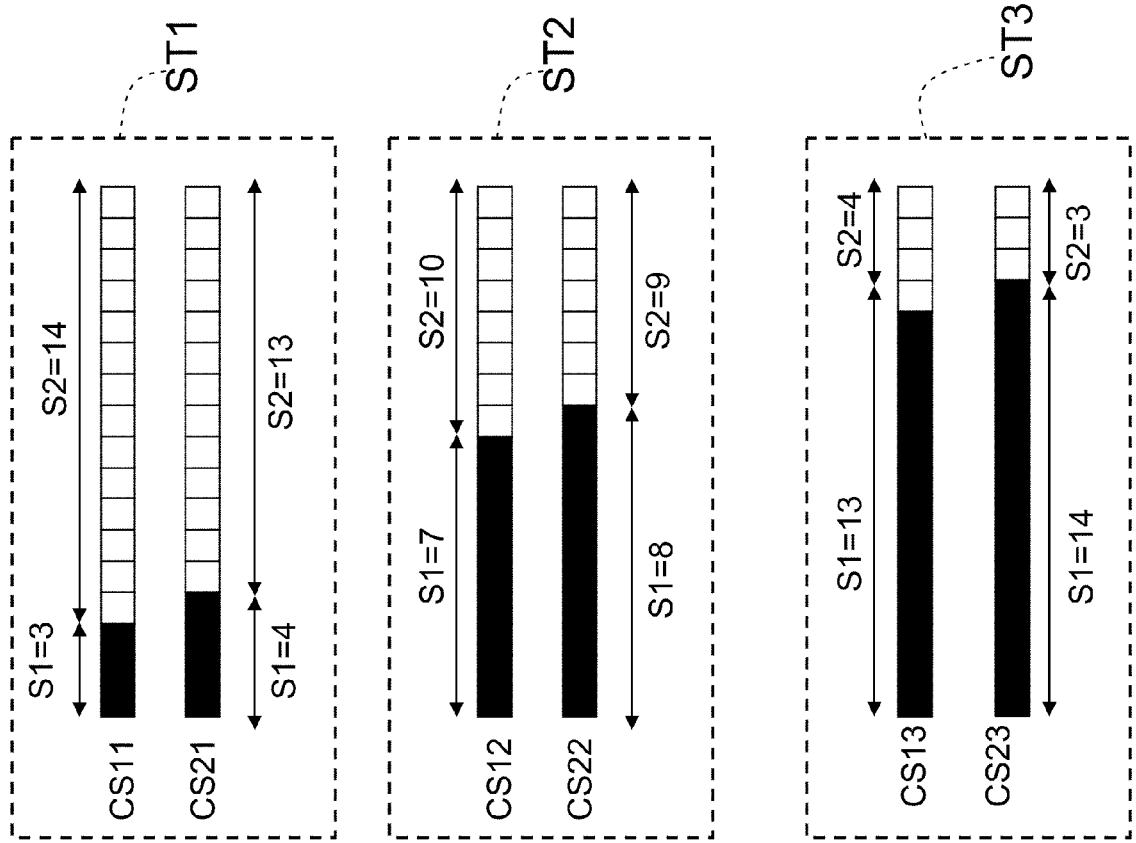
FIG. 5C shows a third embodiment of pattern elements used to apply the visually detectable pattern with the embedded data.

FIG. 5C shows a third embodiment. In this case, the pattern elements are distributed over three subsets ST1, ST2, ST3. Each subset has two pattern elements, CS11, CS21; CS12, CS22 and CS13, CS23 respectively. The first subset ST1 comprises a first pattern element CS11 having an area of length s1=3 with a relatively low value v1 for an optical property and an area of length s2=14 with a relatively high value v2 for said optical property. The first subset ST1 has a second pattern element with an area of length s1=4 with a relatively low value v1 for an optical property and an area of length s2=13 with a relatively high value v2. The length s1, s2 is expressed as a number of length units, a length unit having a predetermined size that depends on the accuracy of the means with which the data is written on the optical record carrier. The second subset has pattern element CS12 with s1=7, s2=10 and CS22 with s1=8, s2=9. The third subset has pattern element CS13 with s1=13, s2=4 and CS23 with s1=14, s2=3.

The mutual distance between two pattern elements CS, CS' is defined as $$D(CS, CS') = \left| \frac{s1}{s1+s2} - \frac{s1'}{s1'+s2'} \right|,$$

wherein s1, s2 are the sizes of the areas with the relatively low value of the optical property and with the relatively high value of the optical property respectively for the pattern element CS, and s1', s2' are the corresponding values for the pattern element CS'.

In this case the distance D between two pattern elements within each subset is 0.059, while the minimal distance between pattern elements of different sets (e.g. between CS21 and CS12) is 0.18, which is three times greater. In this embodiment, a visually detectable pattern having three gray-levels having one embedded data-bit per pattern element can be encoded.

Figure 5D:
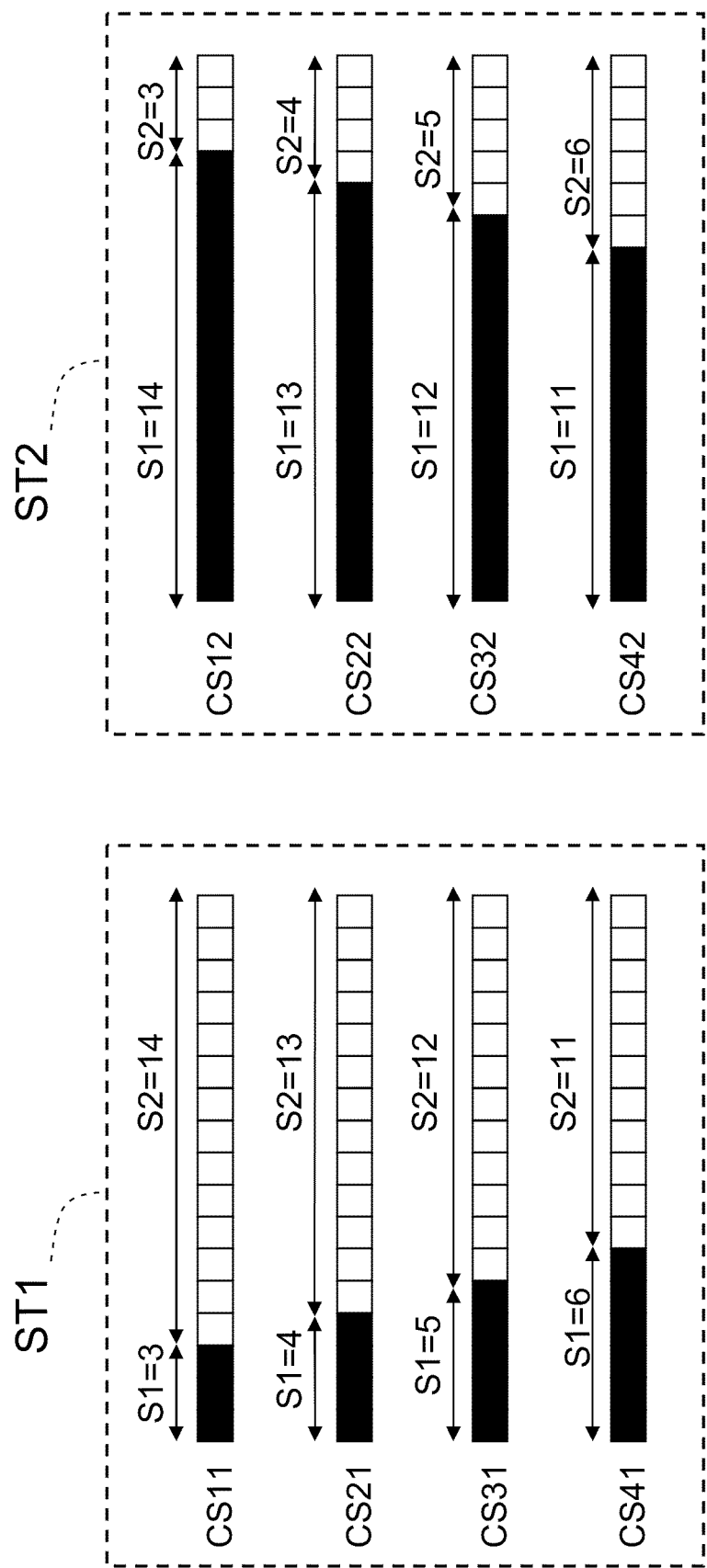
FIG. 5D shows a fourth embodiment of pattern elements used to apply the visually detectable pattern with the embedded data.

FIG. 5D shows a fourth embodiment wherein the pattern elements are distributed over two subsets, each having four pattern elements. The first subset ST1 has pattern elements CS11 with s1=3, s2=14, CS21 with s1=4, s2=13, CS31 s1=5, s2=12 and CS41 with s1=6, s2=11. The second subset ST2 has pattern elements CS12 with s1=14, s2=3, CS22 with s1=13, s2=4, CS32 with s1=12, s2=5 and CS42 with s1=11, s2=6. In this case, the maximum distance between two pattern elements within the same subset is 0.18, while the minimum distance between any pair of pattern elements from mutually different subsets is 0.29. In this embodiment, a binary image having embedded two bits per pixel may be mapped as the visually detectable pattern.

Figure 5E:
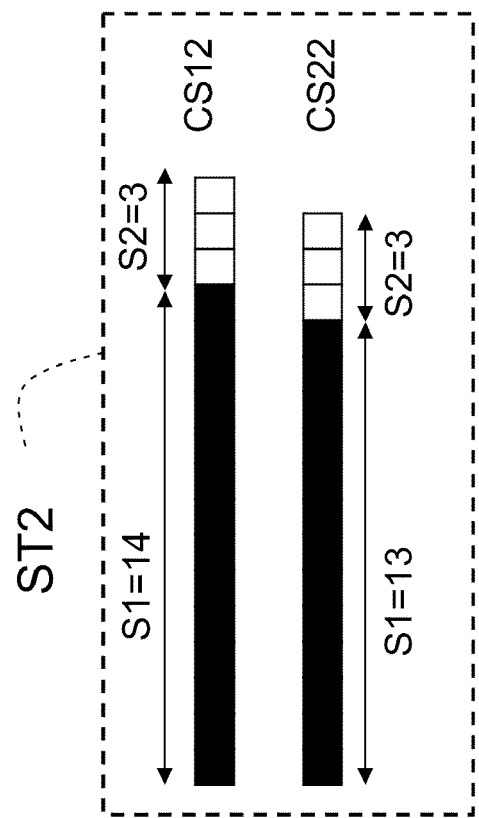
FIG. 5E shows a fifth embodiment of pattern elements used to apply the visually detectable pattern with the embedded data.
Figure 5E:
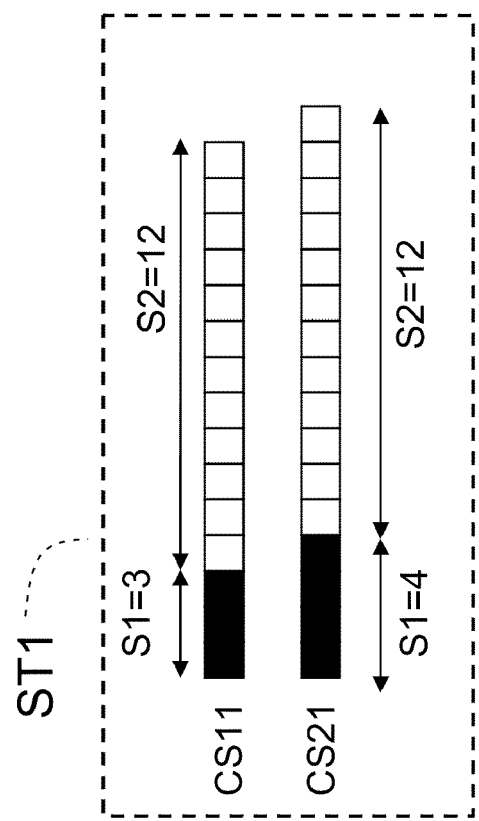

Alternatively another coding may be used having pattern elements in the form of an area of size s1 with a relatively low value v1 for an optical property and an area with size s2 with a relatively high value v2 for said optical property in which pattern elements of different subsets have different length. One example thereof is shown in FIG. 5E. Therein the first pattern element CS11 of the first subset and the first pattern element CS12 of the second subset have a different length, 15 and 17 units respectively. The second pattern element CS21 of the first subset and the second pattern element CS22 of the second subset have an equal length of 16 units. It may also be considered to use only one kind of pixels in the visually detectable pattern, e.g. in a binary image for example only the dark pixels may be used to encode the embedded data. This however makes the data capacity dependent on the visual content of the visually detectable pattern.

The following table summarizes various properties for the sets of pattern elements shown in FIG. 5A-5E as well as for various other examples. Therein MAX is the minimum value of s2 for all pattern elements in the first subset ST1 and of s1 for all pattern elements in the second subset ST2, and MIN is the maximum value of s1 for all pattern elements in the first subset ST1 and of s2 for all pattern elements in the second subset ST2.

Furthermore R is given by:

$$R = \frac{MAX - MIN}{MAX + MIN}$$

The columns D1121, D1222 and D2122 indicate the distances.

Therein $$D1121 = \left| \left( \frac{s1}{s1+s2} \right)_{CS11} - \left( \frac{s1}{s1+s2} \right)_{CS21} \right|,$$

which is the mutual distance between pattern elements of the first subset. Likewise, D1222 is the mutual distance between pattern elements of the second subset. Furthermore, D2122 is the distance between the mutually pattern elements of the first and the second subset.

As can be seen in this table for each of the embodiments, the ratio R is greater than 0.4 and the distance D2122 is substantially larger than the distances D1121 and D1222.

| | ST1 | | | | ST2 | | | | | | | | | |
|---|---|---|---|---|---|---|---|---|---|---|---|---|---|---|
| | CS11 | | CS21 | | CS12 | | CS22 | | | | | | | |
| Format | s1 | s2 | s1 | s2 | s1 | s2 | s1 | s2 | MAX | MIN | R | D1121 | D1222 | D2122 |
| EFM+ | 3 | 14 | 4 | 13 | 14 | 3 | 13 | 4 | 13 | 4 | 0.529412 | 0.058824 | 0.058824 | 0.529412 |
| EFM+a1 | 3 | 14 | 4 | 14 | 14 | 3 | 14 | 4 | 14 | 4 | 0.555556 | 0.045752 | 0.045752 | 0.555556 |
| EFM+a2 | 3 | 14 | 3 | 13 | 14 | 3 | 13 | 3 | 13 | 3 | 0.625 | 0.011029 | 0.011029 | 0.625 |

-continued

| Format | ST1 | | | | ST2 | | | | MAX | MIN | R | D1121 | D1222 | D2122 |
|---|---|---|---|---|---|---|---|---|---|---|---|---|---|---|
| | CS11 | | CS21 | | CS12 | | CS22 | | | | | | | |
| | s1 | s2 | s1 | s2 | s1 | s2 | s1 | s2 | | | | | | |
| ED   | 2 | 9  | 3 | 8  | 9  | 2 | 8  | 3 | 8  | 3 | 0.454545 | 0.090909 | 0.090909 | 0.454545 |
| EDa1 | 2 | 9  | 3 | 9  | 9  | 2 | 9  | 3 | 9  | 3 | 0.5      | 0.068182 | 0.068182 | 0.5      |
| EDa2 | 2 | 9  | 2 | 8  | 9  | 2 | 8  | 2 | 8  | 2 | 0.6      | 0.018182 | 0.018182 | 0.6      |
| CD   | 3 | 11 | 4 | 10 | 11 | 3 | 10 | 4 | 10 | 4 | 0.428571 | 0.071429 | 0.071429 | 0.428571 |
| CDa1 | 3 | 11 | 4 | 11 | 11 | 3 | 11 | 4 | 11 | 4 | 0.466667 | 0.052381 | 0.052381 | 0.466667 |
| CDa2 | 3 | 11 | 3 | 10 | 11 | 3 | 10 | 3 | 10 | 3 | 0.538462 | 0.016484 | 0.016484 | 0.538462 |

Different pairs of pattern elements within a set of pattern elements have a different contrast.

In the first embodiment shown in FIG. 5A, for the pattern elements CS11, CS12, CS21, CS22 respectively the fraction of the total area having the highest value for the optical property (here the brightness) is 0.82, 0.17, 0.76 and 0.23. Hence the pair of pattern elements CS11, CS12 provides for a higher contrast (0.82/0.17=4.8) than the pair of pattern elements CS21, CS22 (0.76/0.23=3.3).

Accordingly, pairs of pattern elements comprising a pattern element from the first subset ST1 and the second subset ST2 can be identified, a first pair comprising primary pattern elements CS11, CS12 that have a large contrast, and a second pair of pattern elements comprising secondary pattern elements CS11, CS12 with less contrast.

According to a favourable embodiment, a relatively high overall contrast of the visually detectable pattern can be obtained by a method wherein the data elements are obtained by conversion of primary data elements using a contrast enhancement code, wherein each contrast enhancement code word comprises a sequence of contrast enhancement code bits that are representative for selection of a primary or a secondary pattern element, wherein the contrast enhancement code words comprise more contrast enhancement code bits representative for a primary pattern element than contrast enhancement code bits representative for a secondary pattern element. The contrast enhancement code promotes that predominantly the primary pattern elements are selected that provide for a high contrast. Preferably the number of contrast enhancement code bits in the contrast enhancement code words representative for the first pair of pattern elements is at least 4 times as high as the number of contrast enhancement code bits in the contrast enhancement code words representative for the second pair of pattern elements.

The following tables show examples of such a contrast enhancement code. Herein a primary data element having a value in the range of 0x0 to 0xF is converted into a contrast enhancement code word, wherein each bit represents the choice for a particular pair of pattern elements. The contrast enhancement code words comprise predominantly bits "0" that are representative for the pair of pattern elements having the highest contrast.

The first table, in FIG. 6A, shows a conversion into 8-bit contrast enhancement code words.

The second table, in FIG. 6B, shows a conversion into 10-bit contrast enhancement code words. In this case, for each code word the number of bits "0" representative for the first pair of pattern elements CS11, CS12 is 5 times as high as the number of contrast enhancement code bits "1" in the contrast enhancement code words representative for the second pair of pattern elements CS21, CS22.

The third table in FIG. 6C shows a conversion into 16-bit contrast enhancement code words. In this case, for each code word the number of bits "0" representative for the first pair of pattern elements CS11, CS12 is 8 times as high as the number of contrast enhancement code bits "1" in the contrast enhancement code words representative for the second pair of pattern elements CS21, CS22.

In each of the tables, the contrast enhancement code words each have the same number of contrast enhancement code bits representative for the second pair of pattern elements. This has the advantage that the visually detectable pattern has a substantially constant contrast, independent of the embedded data.

In the second and the third table, for each contrast enhancement code word contrast enhancement code bits representative for the second pair of pattern elements CS21, CS22 are separated by at least one contrast enhancement code bit representative for the first pair of pattern elements CS11, CS12.

In this way, it is avoided that too many tracks with pattern elements of the second pair are adjacent to each other. Therewith the effective contrast is further improved, as the pattern elements of the second pair appear less pronounced.

As illustrated further in FIG. 3, an 8-bit primary data word is mapped at the visually detectable image. In this case, the primary data word is a byte indicative for a line number of the visually detectable pattern. The two 4-bit nibbles of the 8-bit primary data word (here 0x0E for example) are each converted in a 8-bit contrast enhancement code word, using the first conversion table, so that the primary data word is represented by a 16-bit contrast enhancement code. For each of the 16 subsequent groups of tracks, a respective pair of pattern elements is selected to display the visually detectable pattern. For example in the first group of tracks, the first pair of pattern elements CS11, CS12 is used and in the fifth group of tracks the second pair of pattern elements is used CS21, CS22.

Further one or more sync tracks may be included in the image line for example. The sync tracks for example comprise a sequence of pattern elements of the pair of secondary pattern elements. Alternatively a tertiary set of pattern elements that deviate from the primary and the secondary set of pattern elements may be used for this purpose, e.g. a 3T-8T/8T-3T pattern.

A further improvement of contrast can be obtained by using one of the other tables e.g. the 4 to 10 conversion table of FIG. 6B, or the 4 to 16 conversion table of FIG. 6C.

FIG. 4 shows how in this way 2940 pixels can be encoded utilizing the CD frame encoder hardware for example. As illustrated in FIG. 4, for this example for each rotation of the disc, 30 subcode frames, each comprising 98 frames are used, wherein each frame forms a pixel of the visually detectable pattern. Therein the regular EFM data is replaced by pattern elements having the same length.

FIG. 4 also shows how for those tracks where the contrast enhancement code bit (ce-bit) is 0, the pixels are formed using the first pair of pattern elements, i.e. in this case CS11 to represent bright pixels and CS12 to represent dark pixels. For those tracks where the contrast enhancement code bit (ce-bit) is 1, the pixels are formed using the second pair of pattern elements, i.e. in this case CS21 to represent bright pixels and CS22 to represent dark pixels.

Figure 7A:
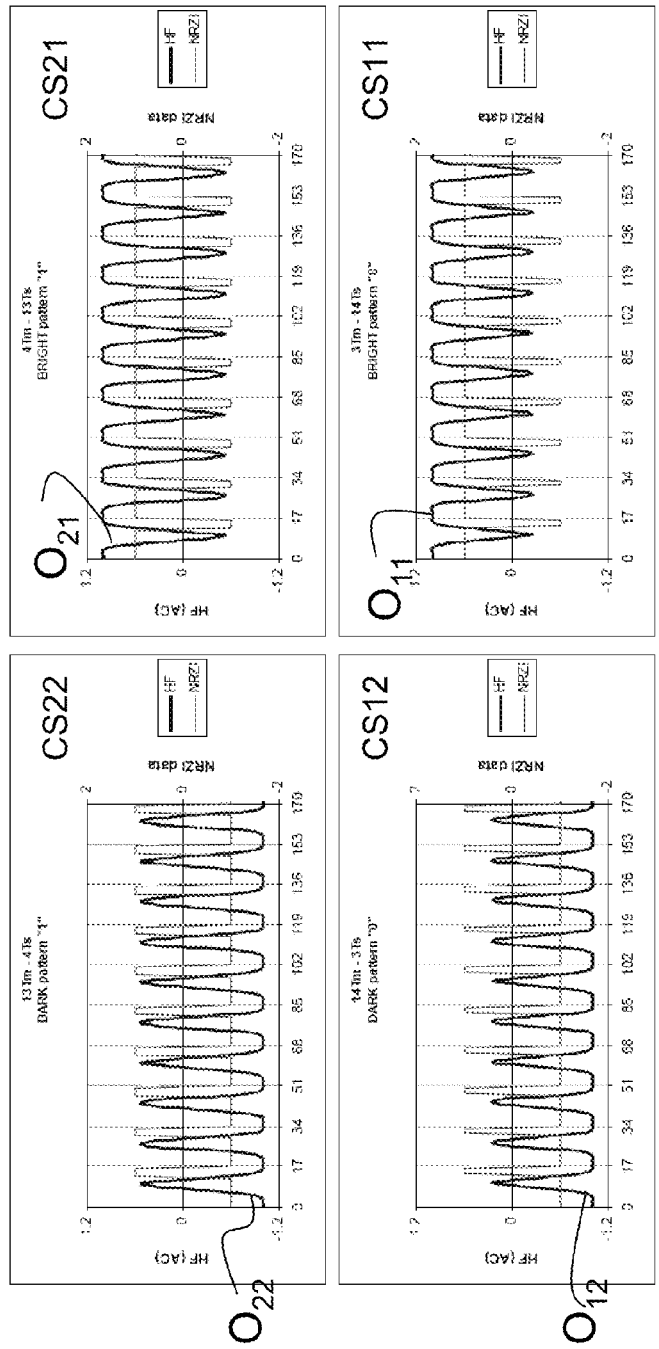
FIG. 7A shows various signals obtained by a method of reading the record carrier according to the invention.

The visual detectable pattern has a resolution that is substantially lower than the resolution with which regular data is recorded. As illustrated in FIG. 4, a pixel of the visually detectable pattern may have a length of 0.1 mm for example. An EFM+ channel bit has a length of about 133 nm. Accordingly an EFM+ channel symbol has a length of 17 channel bits, which equals to 0.0023 mm. If the visually detectable pattern is composed of pattern elements having the same length as the channel symbols used for regular data encoding then in this case a pixel extends over 44 pattern elements. It is advantageous if also the embedded data is present at a low resolution. In that case the visually detectable pattern comprises a repeated pattern of pattern elements, for example a pattern extending over the full length of a pixel, which facilitates detection. This is illustrated in FIG. 7A. Therein the graphs show by way of example the signals $O_{11}$, $O_{21}$, $O_{12}$ and $O_{22}$ generated by the read head for each of the pattern elements CS11, CS21, CS12 and CS22.

Figure 7B:
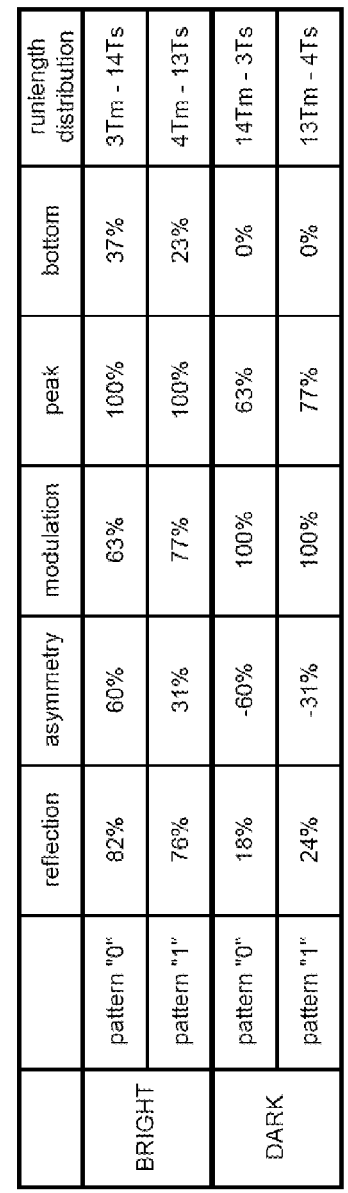
FIG. 7B shows various parameters that are extracted from these signals.

As each pixel is represented by a repeated pattern of pattern elements, i.e. a sequence of identical pattern elements, relatively simple decoding means suffices to retrieve the image data as well as the embedded data from the visually detectable pattern at the record carrier. The table shown in FIG. 7B shows the value of various parameters for these signals.

In an example, the record carrier is rotated at 120 Hz, while 2940 pixels are arranged at a track. In that case, the pixels are scanned at a speed of 2.8 ms/pixel and the reflection should be sampled at a sampling frequency of at least 1 MHz. This is within the capability of state of the art ODD chips.

Figure 8:
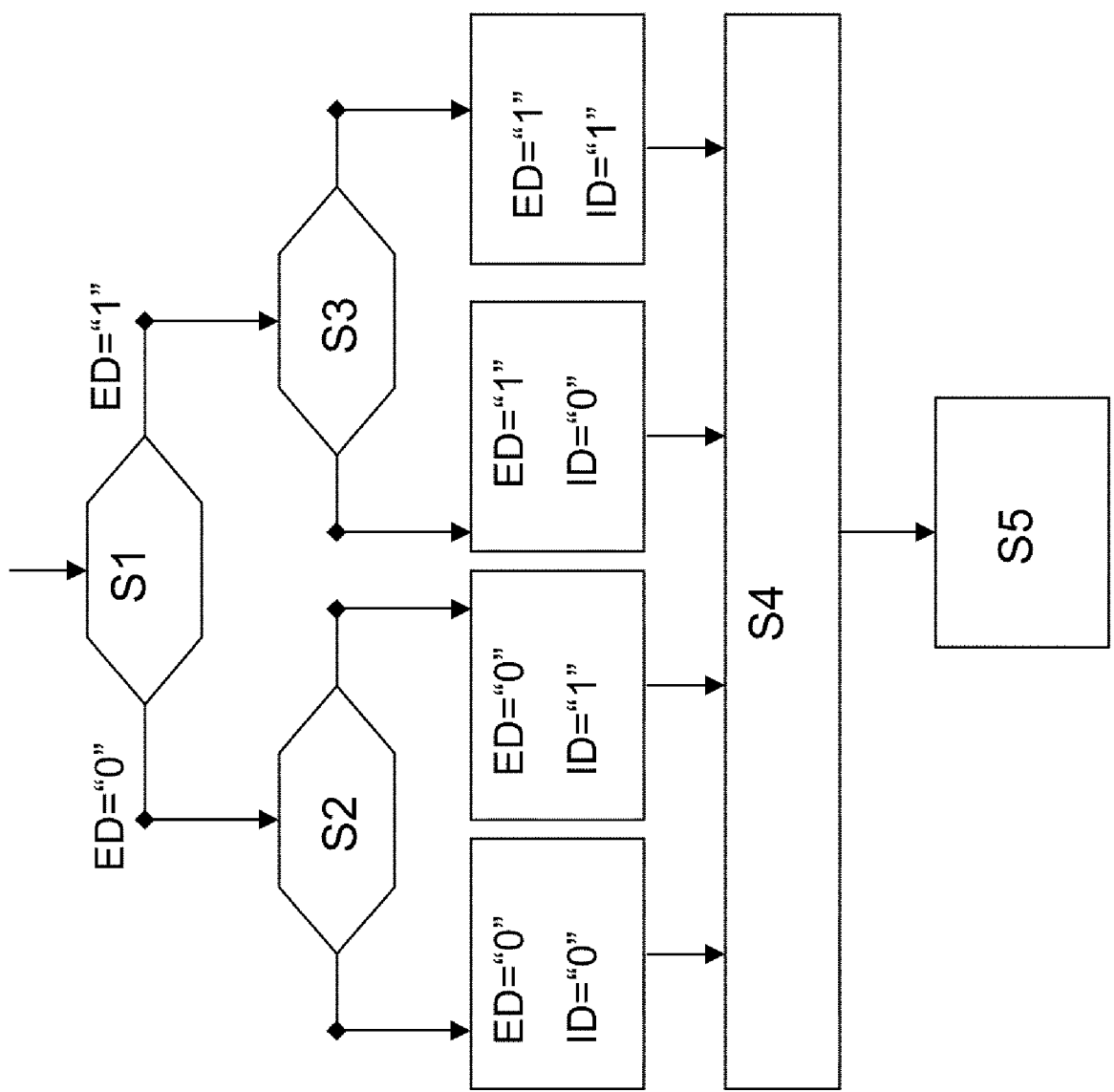
FIG. 8 illustrates a method of reading a record carrier according to the invention.

This can be used in the method illustrated in FIG. 8. In step S1 thereof, it is verified whether the asymmetry of the signal is greater than a threshold value. If that is the case, the embedded data element is classified as "0". Otherwise the embedded data element is classified as "1". The reflection is measured to determine the image data in step S2 and S3. If the reflection is higher than a threshold, the image data ID is identified as "1" otherwise as "0". The threshold level in steps S2 and S3 may be different, taking into account that S2 is carried out after an ED="0" is identified and S3 is carried out after an ED="1" is identified. Alternatively the image data ID and the embedded data may be determined in parallel. Alternatively or in combination other methods may be used to determine the image data and the embedded data, based on modulation, measurement of peak and bottom values for example.

In step S4 an address is calculated from the detected embedded data.

The embedded data represents for example the line number. Using the line number retrieved by detection, the tangential position can be determined by scanning the first line of the image and determining the start of the buffer zone for this line.

Alternatively, a tangential position may be embedded in the visually detectable pattern. For example, a tangential position may be embedded to identify the first pixel of each image line, a plurality of anchor pixels, of each image line or each of the pixels.

In this case the line number may be embedded in addition to the tangential position. Alternatively, the line number may be obtained by other means, for example by detecting a first line of the image as the start of a zone having a content deviation from the regular data content according to a standard, and determining the numbers for the remaining lines using track counting.

Alternatively, address data may be stored within a regular data zone. For example, a predetermined location of the record carrier may contain a reference to a side or a corner of the image. As an example, an alignment angle for the visually detectable pattern is stored at a fixed address at the record carrier, for example at PSN=0x030000 at a predetermined inner radius of 24 mm. Alternatively, the reference may indicated a buffer preceding the visually detectable pattern instead of the visually detectable pattern itself.

Having detected the image data in step S2 or S3 and determined the address in step S4 using the embedded data retrieved in step S1, the image data can be stored at the address in step S5.

Figure 9:
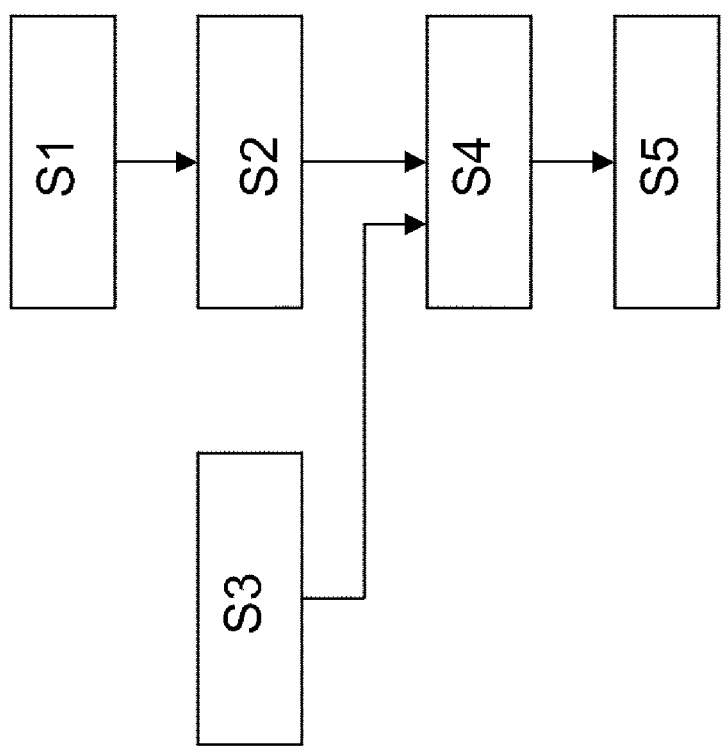
FIG. 9 shows a method for applying a visually detectable pattern with embedded data at a record carrier.

FIG. 9 shows a method of applying image data as a visually detectable pattern with at least one embedded data element at an optical record carrier.

In a step S1, the at least one data-element is obtained. The data-element is obtained for example via a user interface from a user, from a storage element of a device used to apply the image data, or by calculation of the device. This data-element is optionally converted using a contrast enhancement code in step S2, for example according to one of the conversion tables.

In step S3, image data is obtained. The image data is obtained for example via a user interface from a user, from a storage element of a device used to apply the image data, or by calculation of the device. The at least one data-element to be embedded in the visually detectable pattern may be independent from the image data, but may otherwise be related to the image data, for example the at least one data element may be indicative for a structure of the visually detectable pattern.

For the purpose of retrieving the image as a digital representation from the visually detectable pattern, it is preferred that the at least one data element indicates a line number of the image. However, auxiliary data may be embedded in the visually detectable pattern, such as data indicative for the type of conversion table used in step S2, the contrast level, the version number of the format, and the power levels used for writing.

In step S4, a pattern element is selected on the basis of the data to be embedded and on the basis of the image data to be visualized as the visually detectable pattern. The image data determines the selection of the subset and the data to be embedded determines the selection of the pattern element within the subset.

Subsequently in step S5, the selected one pattern element is written to the optical record carrier.

It is noted that the order in which the selection of the pattern element is made is not relevant. First a subset of pattern elements may be selected on the basis of the image data, and subsequently a selection may be made from this subset on the basis of the at least data element to be embedded. Alternatively, first a selection may be made on the basis of the data to be embedded and subsequently a selection on the basis of the image data.

FIG. 10 again shows the system of FIG. 1, here with the drive-module 20 in more detail. As shown therein the drive-module 20 comprises a read/write head 21 to read optically detectable information from the record carrier 40 and to provide an output signal representative for the information read from the record carrier 40 to an RF processing circuit 26 and/or to write optically detectable information at the record carrier 40. The read/write head 21 forms a device for writing pattern elements at the record carrier 40, and comprises for example a device for projecting a radiation beam modulated by a control signal at the record carrier 40. However, other means may be used to apply an optically detectable pattern at the record carrier 40.

The read/write head 21 is movable relative to the record carrier 40 by means comprising a spindle motor 22 for rotating the record carrier 40 and further means, e.g. a slide and a radial actuator (not shown) for radially displacing the read/write head 21 relative to the record carrier 40. The relative movement of the read/write head 21 with respect to the record carrier 40 is controlled by a servo circuit 23. The RF processing circuit 26 decomposes the signal obtained from the read/write head 21 into a first output signal that is provided to a decoder circuit 27, which decodes the first output signal into a digital signal representative for the data stored on the record carrier 40. The RF processing circuit 26 provides a second output signal to an address detection circuit 29 that determines the address at the record carrier 40 that is currently accessed by the read/write head 21. The data obtained by decoder circuit 27 and the address determined by address detection circuit 29 is provided to general controller 30. With this information, the controller 30 controls the servo circuit 23.

The read/write head 21, the RF-processing circuit 26 and the means that introduce a relative movement between the record carrier 40 and the read/write head 21 form a facility for scanning the visually detectable pattern and generating a detection signal representative for a visual property of the pattern as a function of position.

In this case, the record carrier 40 has a plurality of one or more concentrically arranged circular tracks. Alternatively, the tracks may together form a spiral shape around a rotational centre of the record carrier 40. In again another embodiment, the record carrier 40 may have linear tracks, for example in an embodiment wherein the record carrier 40 is formed as a card. In that case the card may be displaced, for example by an XY table, or the read/write head 21 may be displaced, or a combination of both.

Figure 11:
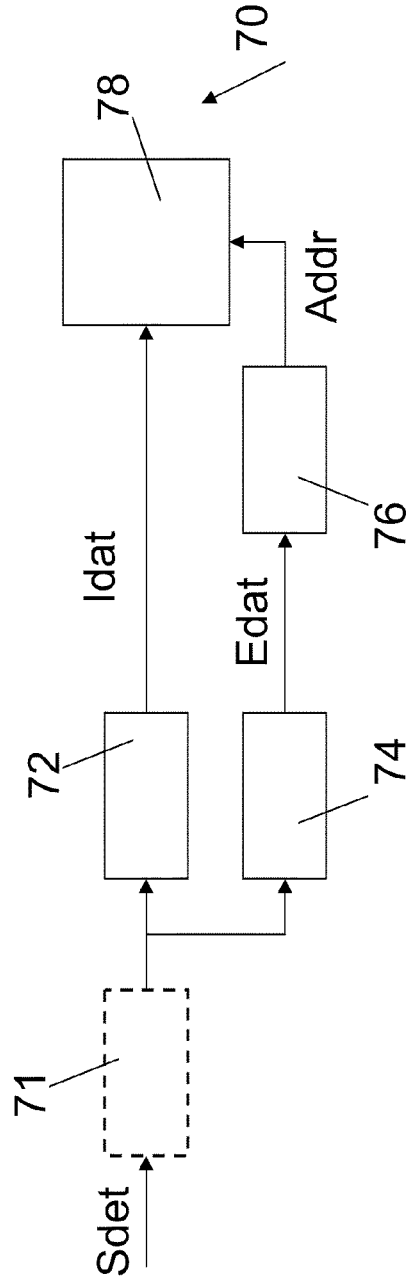
FIG. 11 shows a detail in a first embodiment of the apparatus of FIG. 10.

The drive-module 20 comprises an additional unit 70 that comprises a facility for retrieving image data from the detection signal Sdet, for retrieving embedded data from the detection signal, for generating address data using said embedded data, and for storing image data values at addresses indicated by said address data. Additional unit 70 is shown in more detail in FIG. 11. Therein the facility for retrieving image data Idat from the detection signal is indicated by reference numeral 72 and the unit for retrieving embedded data Edat from the detection signal is indicated by reference numeral 74. Furthermore, the facility for generating address data Addr using said embedded data Edat is indicated by reference numeral 76, and the facility for storing is indicated by reference numeral 78. The facilities 72, 74, 76 may be implemented by dedicated hardware, but may alternatively be implemented as software on a general purpose processor. Such software or dedicated hardware for example carries out the method described with reference to FIG. 8. The facility 78 may be any storage device, like a static or a dynamic RAM, a flash memory etc. Optionally, a normalization facility 71 may be present that normalizes the detection signal Sdet before further processing. Normalization may take place, by scaling the detection signal such that over a plurality of lines the maximum value in the original detection signal is normalized to a predetermined first value and the minimum value in the original detection signal is scaled to a predetermined second value.

Figure 12:
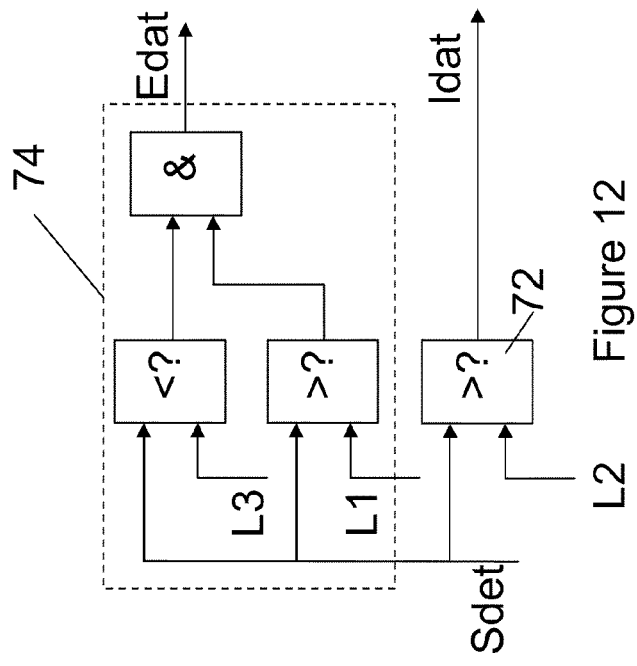
FIG. 12 shows a detail in a second embodiment of the apparatus of FIG. 10.

An example of the facility 72 for retrieving image data and the facility 74 for retrieving embedded data is shown in FIG. 12. In this embodiment, the facility 72 is a comparator that provides an indication whether the value of the detection signal Sdet is higher than a threshold level L2. The facility 74 comprises a first comparator that provides an indication whether the value of the detection signal Sdet is higher than a low threshold L1 and a second comparator that provides an indication whether the detection signal Sdet is lower than a high threshold L3, wherein L1<L2<L3.

Other embodiments may be used comprising one or more detectors for detects a bottom value, a top value, a duty cycle. As indicated in the table, both the value of the image data represented by the visually detectable pattern and the data embedded therein can be retrieved from detection results. An even better recognition accuracy is achieved when retrieving this data on the basis of a combination of such detection results.

Regular data is written on the record carrier 40 by an encoder 31, 32, write strategy unit 33, a driver 24 and the read/write head 21. The encoding may include an error protection encoding 31 (e.g. Reed-Solomon) and a channel encoding 32 which is dependent on the medium used for the record carrier 40. (e.g. an EFM coding for CD, EFM+ for DVD and 17PP for BD). The encoded signal is provided to the write strategy unit 33 that calculates a required modulation of a signal to be sent to the read/write head 21 in order to optimally represent the encoded signal. This is dependent on the type of record carrier 40 used, e.g. whether the record carrier 40 comprises an active layer on the basis of a phase change material, a dye etc.

The driver 24 converts the output signal into a signal suitable to drive a write facility of the read/write head 21. Usually the write facility comprises a laser and a lens system for providing a focused beam on the record carrier 40. The actual power applied to the write facility is further regulated by a laser power controller 25. The laser power controller 25 monitors the intensity of the laser beam in response to the signal provided by the driver 24 and adjusts the driver 24 to compensate for temperature changes and temporal deterioration of the laser in the read/write head 21.

The components in the drive-module 20 forming the facility for physically mapping at least one embedded data element as a pattern element onto the record carrier 40 may be substantially the same as those used for recording regular machine-readable data. As for the machine readable data, the visible pattern is generated at the recording layer 41 of the record carrier 40 by modulating an intensity of the laser beam from the read/write head 21 while providing a relative displacement between the read/write head 21 and the record carrier 40. Likewise the image data represented at the record carrier 40 and the at least one data-element embedded therein are written as pattern elements at the record carrier 40. Preferably, the encoder 32 is reused for generating the sequence of pattern elements to be written, so that no additional hardware is required. Alternatively, a different encoder may be used for this purpose to have more flexibility. According to the present invention, the facility for physically mapping comprises a selection module 36 for selecting a pattern element SC on the basis of the image data ID, and the at least one embedded data element ED.

Figure 13:
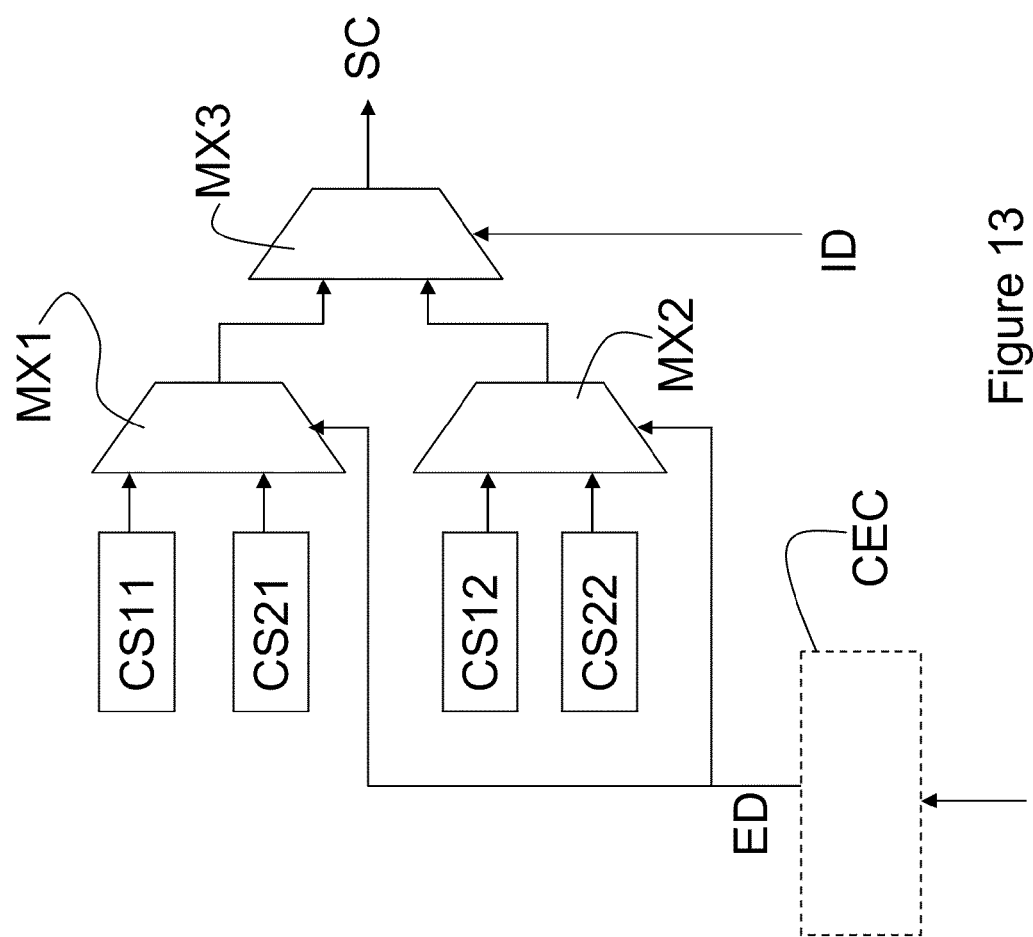
FIG. 13 shows a detail in a third embodiment of the apparatus of FIG. 10.

FIG. 13 shows a first embodiment of the selection module 36 that may select a pattern element SC, given an embedded data element ED, an image data element ID and a set of pattern elements, for example the pattern elements shown in one of the FIGS. 5A-5C. The selection module shown therein comprises a set of storage elements that comprise control data for the pattern elements CS11, CS21, CS12, CS22 from which a selection can be made. A first multiplexer MX1 is coupled to a pair of storage elements comprising control data for the pattern elements of the first subset ST1 and a second multiplexer MX2 is coupled to a pair of storage elements comprising control data the pattern elements of the second subset ST2. A third multiplexer MX3 is coupled to the outputs of the first and the second multiplexer MX1, MX2. The embedded data element ED may be for example a bit of a primary data element, but it may alternatively be a bit of a contrast enhancement codeword that is derived from the primary data element, as indicated by the dashed box CEC representing a contrast enhancement code module. The contrast enhancement code module may for example apply a conversion table according to FIG. 6A, 6B or 6C. The image data element may be a bit that indicates whether the gray value to be mapped in the visually detectable pattern is higher or lower than a threshold value. On the basis of the embedded data element ED, the multiplexers MX1, MX2 respectively select control data for a pattern element from the first and the second subset ST1, ST2. On the basis of the image data element, the third multiplexer MX3 selects the control data from one of the multiplexers MX1, MX2, and offers the selected control data SC at its output. The selected control data may control the driver 24 immediately. Alternatively, the selection module 36 may provide an indication to the encoder 32, wherein the latter generates the pattern element indicated by the selection module 36.

Figure 14:
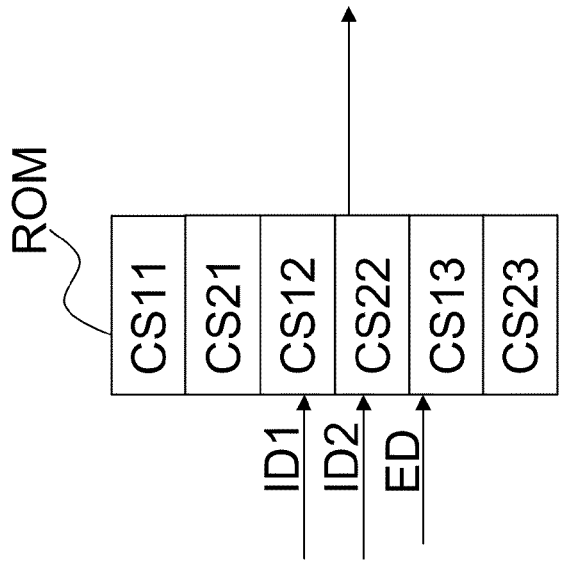
FIG. 14 shows a detail in a fourth embodiment of the apparatus of FIG. 10.

An alternative selection module is shown in FIG. 14. Therein the selection module comprises a lookup table, for example in the form of a ROM having stored therein a set of control data, for example the control data for the pattern elements according to the embodiment of FIG. 5C. The ROM is addressed by a first and a second most significant address line with the image data ID1, ID2 and by a third, least significant address line with the embedded data ED.

Figure 10:
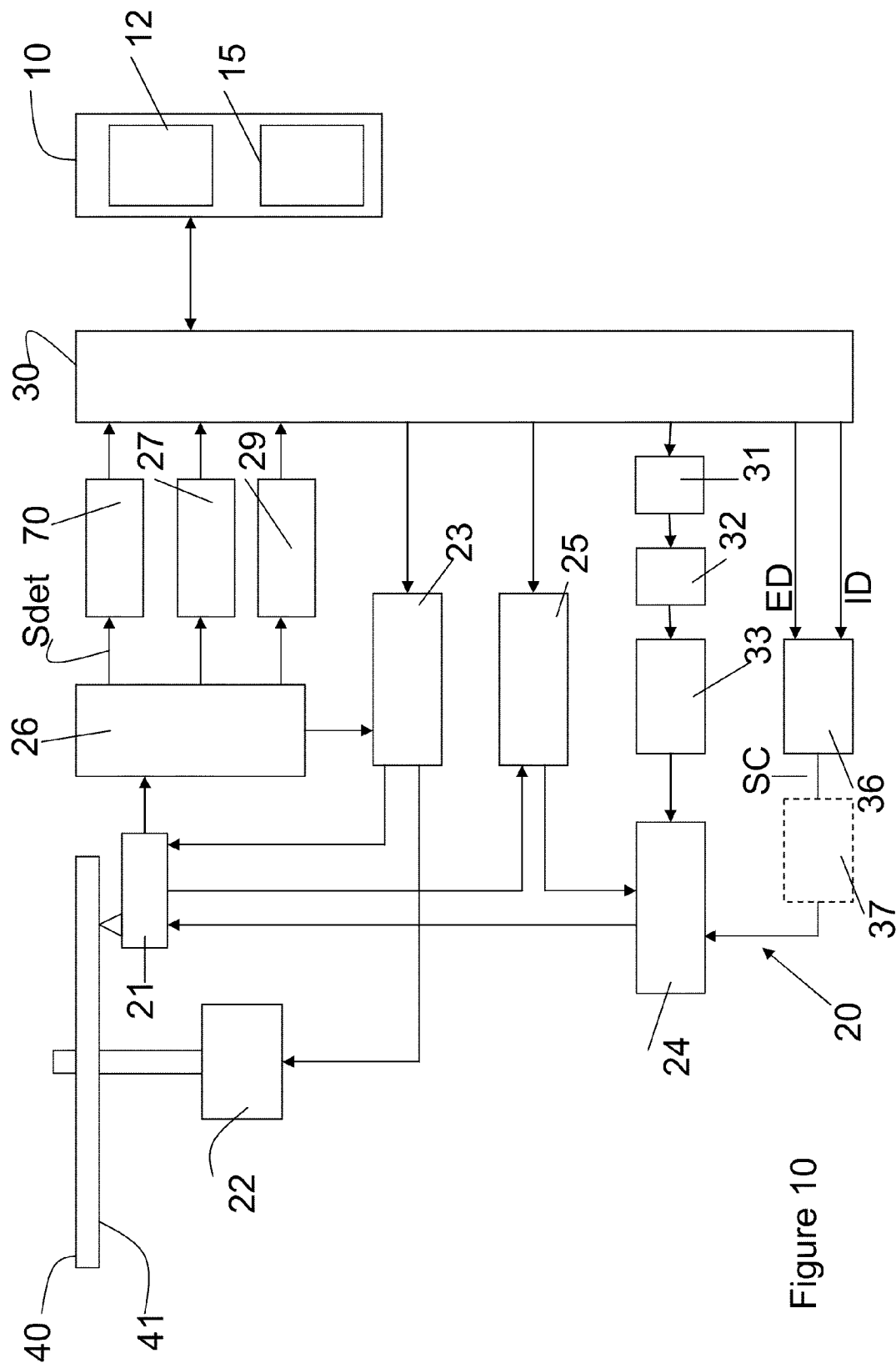
FIG. 10 shows an apparatus according to the invention for applying and for reading a visually detectable pattern with embedded data at a record carrier.

In the apparatus shown in FIG. 10, a further improvement of the contrast is achieved in that the device for writing the selected one pattern element at the record carrier 40 has a controllable setting for the peak power, and a facility for selecting the setting of the peak power in dependence on the subset associated with the pattern element to be written. If for example, a visually detectable pattern is written at the record carrier 40 using the sets of pattern elements of FIG. 5A, and an increased writing power results in a lower value for the optical property, the pattern elements of the second set ST2 are written with a higher peak power than the pattern elements of the first subset ST1. If alternatively an increase in power would result in a higher value for the optical property, the pattern elements of the first subset ST1 would be written with the relatively high peak power. In both ways, a higher contrast of the visually detectable pattern is achieved. It is not a disadvantage that therewith the power level may deviate from what is optimal in data recording purposes, as only a subset of data pattern elements is used from what is used in regular data recording so that these pattern elements can still be detected reliably.

Figure 15C:
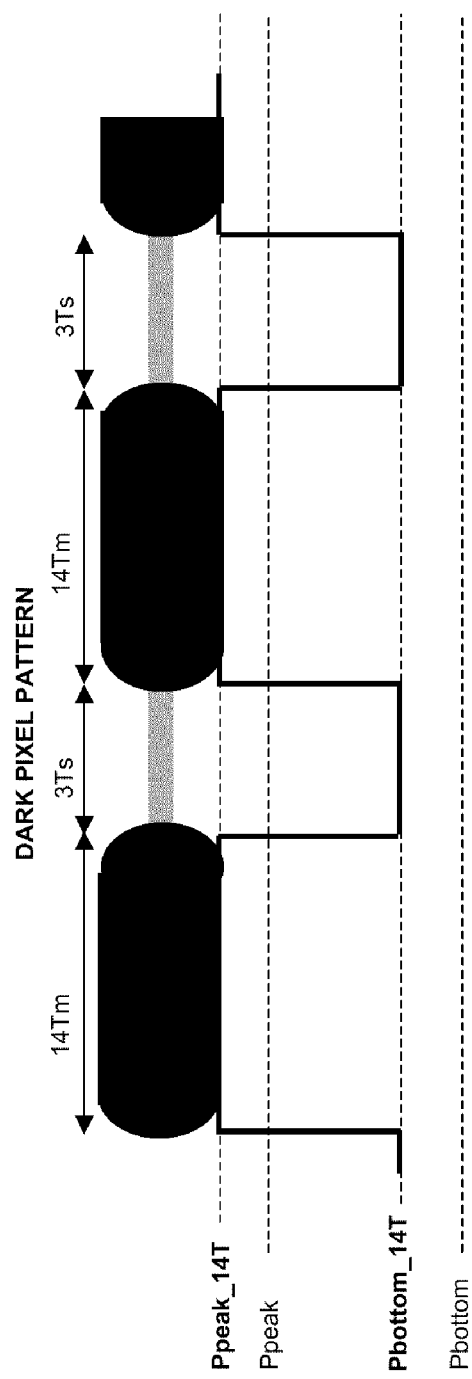
FIG. 15C illustrates a third aspect of a method according to the invention of writing a visually detectable pattern with embedded data at a record carrier.

This improvement is illustrated in FIGS. 15A-15C. The pattern elements representing a dark pixel are applied using higher peak power Ppeak_14T, see FIG. 15A. The visual image is recorded by laser pulses having dominating long marks CS12, CS22 (13 Tm and 14 Tm) for the dark pixels and having dominating long spaces CS11, CS21 (13 Ts and 14 Ts) for the bright pixels. The pulses used for writing the long marks have a high laser power, so therewith creating also wider marks. In grey the normal situation is shown for comparison. The increased width is schematically shown by the black marks. The increased width of the marks results in more image contrast. Similar, the marks representing bright pixels use a lower peak power Ppeak_3T as depicted in FIG. 15B. These marks become narrower resulting in more image contrast too. In grey the normal situation is shown. The decreased width is schematically shown by the black marks.

Moreover, it is also possible to increase the read level Pbottom_14T used to form the spaces in the pattern elements representing the dark pixels so that the overall reflection by these spaces is lowered. This illustrated in FIG. 15C. The dark pixel pulses use high laser bottom power resulting in narrow marks during the space period. In grey the new situation is shown. Note that the space reflection in this case may not drop below the slicer level, as this could hamper detection of the embedded data.

The apparatus shown in FIG. 10 may have an auto-pattern generator 37 indicated in dashed form that generates the desired pattern as a function of the pattern element provided by the pattern element selection module 36.

In the examples presented above the present invention is presented in particular for disc-shaped optical record carriers wherein the optical record carrier is scanned during writing and reading by the combination of a rotating movement of the record carrier and a radial movement of the read head. The invention is however equally applicable to other types of optical record carriers, e.g. card-shaped and a relative movement between the read/write-head and the record carrier may be realized in any other way, for example by an XY-table that moves the read/write-head or the record carrier.

In the claims, the word "comprising" does not exclude other elements or steps, and the indefinite article "a" or "an" does not exclude a plurality. A single component or other unit may fulfil the functions of several items recited in the claims. The mere fact that certain measures are recited in mutually different claims does not indicate that a combination of these measures cannot be used to advantage. Various aspects of the invention may be applied independently.

It is noted that data and signal processing facilities, such as data encoding, data decoding, controlling a power of a radiation beam, controlling a relative movement between a targeted spot of radiation and a record carrier may be formed by dedicated hardware, but may alternatively be formed by a suitably programmed general purpose processor or a combination of both. A single processor may perform various functions.

The invention claimed is:

1. Method of writing a visually detectable pattern embedded an information data at an optical disc, comprising the steps of,
    receiving an image data for printing the visually detectable pattern on the optical disc;
    receiving the information data for being recorded in the optical disc;
    selecting a pattern group from at least two pattern groups according to the image data, wherein each pattern group includes at least two pattern elements;
    selecting a pattern element belonging to the selected pattern group according to the information data; and
    generating a write signal according to the selected pattern element; and
    writing the visually detectable pattern at the optical disc using the write signal,
    wherein the pattern groups present different graylevels of the image data,
    wherein the pattern elements belonging to the same pattern group present different bit data of the information data.

2. Method of writing according to claim 1, wherein the variations of the values of the optical property between the pattern elements belonging to the same pattern group is smaller than the variations of the values of the optical property between the pattern groups.

3. Method of writing according to claim 1, wherein each pattern group represents a kind of graylevels of the image data.

4. Method of writing according to claim 1, wherein each pattern element belonging to the same pattern group represents at least one bit data for embedding the information data in the visually detectable pattern.

5. Method of writing according to claim 1, wherein each pattern group includes two pattern elements, one of the pattern element represents a bit "0", and the other pattern element represents a bit "1".

6. Method of reading an information data embedded in a visually detectable pattern from an optical disc, the method comprising the steps of:

scanning the visually detectable pattern comprising at least one pattern element, wherein the pattern element is selected from at least two pattern groups, and each of pattern group includes at least two pattern elements;

generating a detection signal;

verifying whether an asymmetry of the detection signal is greater than a threshold value; and retrieving the embedded information data recorded in the optical disc according to the verifying result, wherein the pattern groups present different graylevels of the image data, wherein the pattern elements belonged to the same pattern group present different bit data of the information data.

7. Method of reading according to claim 6, wherein the variations of the values of the optical property between the pattern elements belonging to a same pattern group is smaller than the variations of the values of the optical property between the pattern groups.

* * * * *